US011318961B2

(12) United States Patent
Kim et al.

(10) Patent No.: US 11,318,961 B2
(45) Date of Patent: May 3, 2022

(54) ROBOT FOR VEHICLE AND CONTROL METHOD THEREOF

(71) Applicant: LG Electronics Inc., Seoul (KR)

(72) Inventors: Hyongguk Kim, Seoul (KR); Hyeongjin Im, Seoul (KR); Yoonjung Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/490,522

(22) PCT Filed: Jan. 17, 2019

(86) PCT No.: PCT/KR2019/000693
§ 371 (c)(1),
(2) Date: Aug. 30, 2019

(87) PCT Pub. No.: WO2020/017716
PCT Pub. Date: Jan. 23, 2020

(65) Prior Publication Data
US 2021/0331706 A1    Oct. 28, 2021

Related U.S. Application Data

(60) Provisional application No. 62/700,917, filed on Jul. 20, 2018.

(30) Foreign Application Priority Data

Nov. 6, 2018 (KR) .................. 10-2018-0135414

(51) Int. Cl.
*B60W 60/00* (2020.01)
*B60K 35/00* (2006.01)
(Continued)

(52) U.S. Cl.
CPC ......... *B60W 60/0027* (2020.02); *B60K 35/00* (2013.01); *B60Q 5/005* (2013.01);
(Continued)

(58) Field of Classification Search
CPC ....... B60W 60/0027; B60W 2554/402; B60W 2554/4041; B60W 2540/225;
(Continued)

(56) References Cited

U.S. PATENT DOCUMENTS 9,315,152 B1    4/2016 Maestas et al.
10,007,263 B1 *  6/2018 Fields .................. G05D 1/0061
(Continued)

FOREIGN PATENT DOCUMENTS

JP        2003301639      10/2003
KR        101261585        5/2013
(Continued)

OTHER PUBLICATIONS

Machine English translation of Yoshito JP2003301639 A (Year: 2003).*
Machine English translation of Kim KR101821496 B1 (Year: 2016).*

*Primary Examiner* — Thomas G Black
*Assistant Examiner* — Brittany Renee Peko
(74) *Attorney, Agent, or Firm* — Fish & Richardson P.C.

(57) ABSTRACT

The present disclosure relates to a robot provided in a vehicle capable of performing a function related to the vehicle. The robot includes a body, a head positioned above the body, an actuator configured to apply an external force to allow the head to move relative to the body, a camera disposed on the head to capture an image, a communication unit configured to perform communications with one or more devices provided in the vehicle, and a processor configured to control the actuator so that the camera is (Continued)

directed toward an inside or outside of the vehicle based on information received via the communication unit.

19 Claims, 20 Drawing Sheets

(51) Int. Cl.
*B60Q 5/00* (2006.01)
*G05D 1/00* (2006.01)
*G05D 1/02* (2020.01)
*G06K 9/00* (2022.01)
*H04N 5/232* (2006.01)
*H04N 7/18* (2006.01)
*H04L 67/12* (2022.01)

(52) U.S. Cl.
CPC ......... *G05D 1/0061* (2013.01); *G05D 1/0246* (2013.01); *G06K 9/00302* (2013.01); *G06K 9/00355* (2013.01); *G06K 9/00845* (2013.01); *G06K 9/00892* (2013.01); *H04N 5/23216* (2013.01); *H04N 7/188* (2013.01); *B60K 2370/1526* (2019.05); *B60K 2370/21* (2019.05); *B60W 2520/10* (2013.01); *B60W 2520/12* (2013.01); *B60W 2540/21* (2020.02); *B60W 2540/221* (2020.02); *B60W 2540/223* (2020.02); *B60W 2540/225* (2020.02); *B60W 2554/402* (2020.02); *B60W 2554/4041* (2020.02); *B60W 2554/4042* (2020.02); *B60W 2554/4043* (2020.02); *B60W 2554/4044* (2020.02); *H04L 67/12* (2013.01)

(58) Field of Classification Search
CPC ..... B60W 2554/4042; B60W 2540/21; B60W 2554/4044; B60W 2540/223; B60W 2540/221; B60W 2554/4043; B60W 2520/10; B60W 2520/12; B60K 35/00; B60K 2370/1526; B60K 2370/21; B60Q 5/005; G05D 1/0061; G05D 1/0246; G06K 9/00302; G06K 9/00355; G06K 9/00845; G06K 9/00892; H04N 5/23216; H04N 7/188; H04L 67/12
See application file for complete search history.

(56) References Cited

U.S. PATENT DOCUMENTS

| | | | | |
|---|---|---|---|---|
| 2012/0173069 | A1* | 7/2012 | Tsimhoni | G01C 21/00 701/25 |
| 2017/0017851 | A1* | 1/2017 | Matsui | G06K 9/00845 |
| 2018/0350144 | A1* | 12/2018 | Rathod | G06T 19/003 |
| 2020/0055399 | A1* | 2/2020 | Yamada | B60K 35/00 |
| 2020/0079368 | A1* | 3/2020 | Yamada | B60W 30/09 |
| 2020/0231182 | A1* | 7/2020 | Oba | B60W 60/00 |
| 2021/0020145 | A1* | 1/2021 | Hirata | G09G 5/38 |

FOREIGN PATENT DOCUMENTS

| | | |
|---|---|---|
| KR | 20160076294 | 6/2016 |
| KR | 20160134075 | 11/2016 |
| KR | 20170028126 | 3/2017 |
| KR | 101821496 | 3/2018 |

* cited by examiner (a)

(b)

(a)  (b)

(c)

(a)

(b)            (c)

(a)

(b)

(a)

(b)

(c)

(a)

(b)

ROBOT FOR VEHICLE AND CONTROL METHOD THEREOF

CROSS-REFERENCE TO RELATED APPLICATIONS

This application is the National Stage filing under 35 U.S.C. 371 of International Application No. PCT/KR2017/000693, filed on Jan. 17, 2019, which claims the benefit of earlier filing date and right of priority to U.S. Provisional Application No. 62/700,917 filed Jul. 20, 2018 and Korean Application No. 10-2018-0135414, filed on Nov. 6, 2018, the contents of each are incorporated by reference.

TECHNICAL FIELD

The present disclosure relates to a robot provided in a vehicle capable of performing a function related to the vehicle.

BACKGROUND ART

A vehicle is an apparatus capable of moving a user in the user-desired direction. Typically, a representative example may be a car.

Meanwhile, for convenience of a user using a vehicle, various types of sensors and electronic devices are provided in the vehicle. Specifically, a study on an Advanced Driver Assistance System (ADAS) has been actively carried out. In addition, an autonomous vehicle is actively under development.

Vehicles may be included in a means of transportation. The means of transportation may be any kinds of transport facilities used to carry people or cargo, for example, a car, a motorcycle, a bicycle, a train, a bus, a tram, and the like. Descriptions related to a vehicle described herein may be similarly or equally applied to all kinds of transportation.

Nowadays, Artificial Intelligence (AI) is being actively researched. Further, AI technologies are being employed to produce a vehicle that can be used in a more convenient way. As a result, a vehicle such as autonomous (or self-driving) vehicle has been introduced.

Furthermore, as part of the AI research, efforts are currently underway to make use of the AI more easily and conveniently through enhanced interaction with a user. For the enhanced interaction with the user, a robot having appearance that gives a sense of intimacy is provided, thereby utilizing vehicle functions more easily. Also, various ways to provide new AI functions have been introduced. To this end, a robot capable of making a better interaction with the user, and a method controlling the same have been actively developed.

DISCLOSURE

Technical Problem

One aspect of the present disclosure is to provide a robot capable of providing vehicle functions in an easier and more intuitive manner, and a control method thereof.

Another aspect of the present disclosure is to provide a robot capable of performing better interaction with a user by providing a function desired based on a result of detecting and analyzing a surrounding situation, and a control method thereof.

Technical Solution

In order to achieve the aspects and other advantages, there is provided a robot installed in a vehicle capable of performing a function related to the vehicle. The robot may include a body, a head positioned above the body, an actuator configured to apply an external force to allow the head to move relative to the body, a camera disposed on the head to capture an image, a communication unit configured to perform communications with one or more devices provided in the vehicle and a processor configured to control the actuator so that the camera is directed toward an inside or outside of the vehicle based on information received via the communication unit.

In one embodiment of the present disclosure, the processor may control the actuator for capturing an object, when the object enters a predetermined area defined based on the vehicle.

In one embodiment of the present disclosure, the processor may monitor the object entering the predetermined area by using an image received from an image sensor provided in the vehicle, and may control the actuator so that the camera is directed toward a different direction according to a position of the object.

In one embodiment of the present disclosure, an image output unit configured to display visual information on a windshield of the vehicle may be further provided. The processor may set some portions of the windshield as an image display area based on the position of the object, and control the actuator to display the visual information on the image display area. The image display area may be changed according to the position of the object.

In one embodiment of the present disclosure, the processor may identify a touch applied to the image display area by using the image captured by the camera, and may perform at least one function based on the identified touch.

In one embodiment of the present disclosure, the processor may determine a target for the visual information, output the visual information as it is when the target is located inside of the vehicle, and output the visual information by inverting left and right when the target is located outside of the vehicle.

In one embodiment of the present disclosure, at least one of devices provided in the vehicle may be operated to transmit information via the communication unit when the vehicle is turned off, and the at least one device operated while the vehicle is turned off may be variably determined by the processor.

In one embodiment of the present disclosure, the processor may perform user authentication for the object in response to the object entering the predetermined area while the vehicle is turned off, and transmit a control command for operating the at least one or more of the devices via the communication unit when the user authentication is successfully completed.

In one embodiment of the present disclosure, the processor may select at least one of a plurality of lamps, door locks, direction indicators, and a horn of the vehicle based on the position of the object, and transmit a control command to the communication unit so that the selected one is operated.

In one embodiment of the present disclosure, the processor, when a plurality of objects enters the predetermined area, may control the actuator to calculate priorities based on at least one of a size, a speed, and a type of object, so as to monitor an object having the highest priority.

In one embodiment of the present disclosure, the processor may calculate at least one of a travelling direction and a travelling speed for monitoring the object, and control the communication unit to enable autonomous driving of the vehicle according to the calculated one.

In one embodiment of the present disclosure, a memory may be further provided. The processor may store object information in the memory when the object enters the predetermined area while the vehicle is turned off. The process may set a direction that is the most frequently approached by objects as a basic monitoring direction based on object information stored in the memory, and control the actuator so that the camera is directed toward the basic monitoring direction when the vehicle is turned off.

In one embodiment of the present disclosure, the processor may control the actuator to face toward a passenger when a voice command is input from the passenger on board.

In one embodiment of the present disclosure, the processor may detect an object viewed by the passenger in the vehicle based on information received via the communication unit, and control the actuator so that the camera captures the detected object.

In one embodiment of the present disclosure, a memory may be further provided. The processor may store an image captured by the camera in the memory when a vital sign of the passenger satisfies reference criteria. The vital sign may be defined by at least one of a heart rate, a voice, a facial expression, a gesture, and eye movement of the passenger.

In one embodiment of the present disclosure, the processor may control the actuator so that at least one of a moving speed and a moving distance of the head of the robot is changed according to a driving speed of the vehicle.

In one embodiment of the present disclosure, the processor may control the actuator so that the camera monitors outside of the vehicle when a driver in a driver's seat of the vehicle is a predetermined person, and monitors the driver when the driver is not the predetermined person.

In one embodiment of the present disclosure, the processor may control the actuator to monitor inside of the vehicle when a passenger is in the vehicle, and monitor outside of the vehicle when no passenger is in the vehicle In one embodiment of the present disclosure, the processor may control the actuator so that the camera monitors outside of the vehicle when the vehicle is driven manually, and monitors inside of the vehicle when the vehicle is driven autonomously.

In one embodiment of the present disclosure, the processor may control the actuator to monitor a driver in the vehicle, instead of monitoring outside of the vehicle, when the driver in the vehicle shows a predetermined behavior while the vehicle is driven manually.

Advantageous Effects

According to embodiments of the present disclosure, one or more of the following effects can be provided.

First, a function desired by a user is provided in an intuitive manner by using a robot capable of interacting with the user, thereby allowing the user to use vehicle functions more easily and conveniently.

Second, user convenience can be further enhanced by providing a new vehicle function through interaction with the user.

Figure 1:
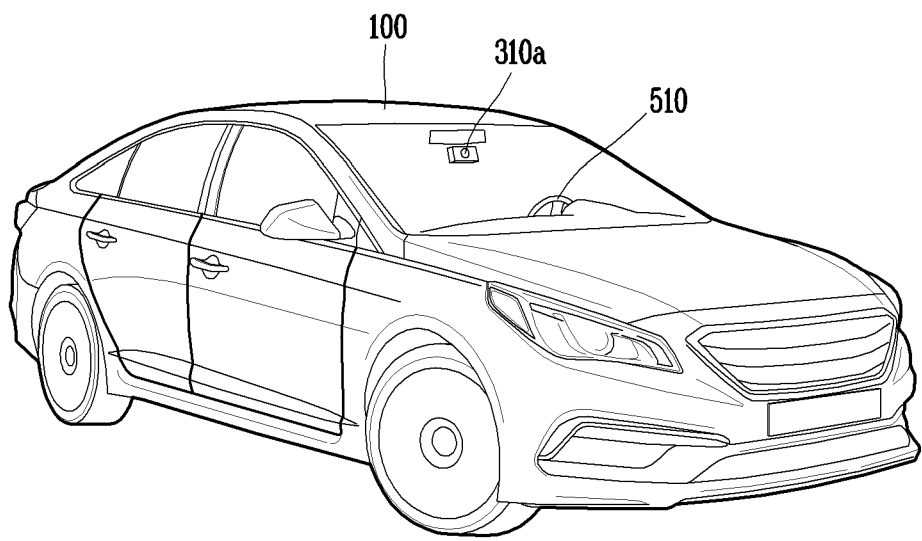
FIG. 1 is a view illustrating appearance of a vehicle in accordance with an embodiment of the present disclosure.
Figure 1:
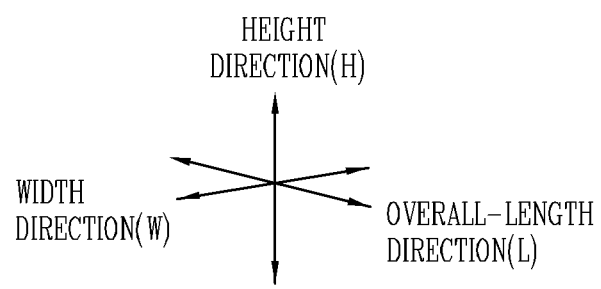

MODES FOR CARRYING OUT THE
PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating appearance of a vehicle in accordance with an embodiment of the present disclosure.

Figure 2:
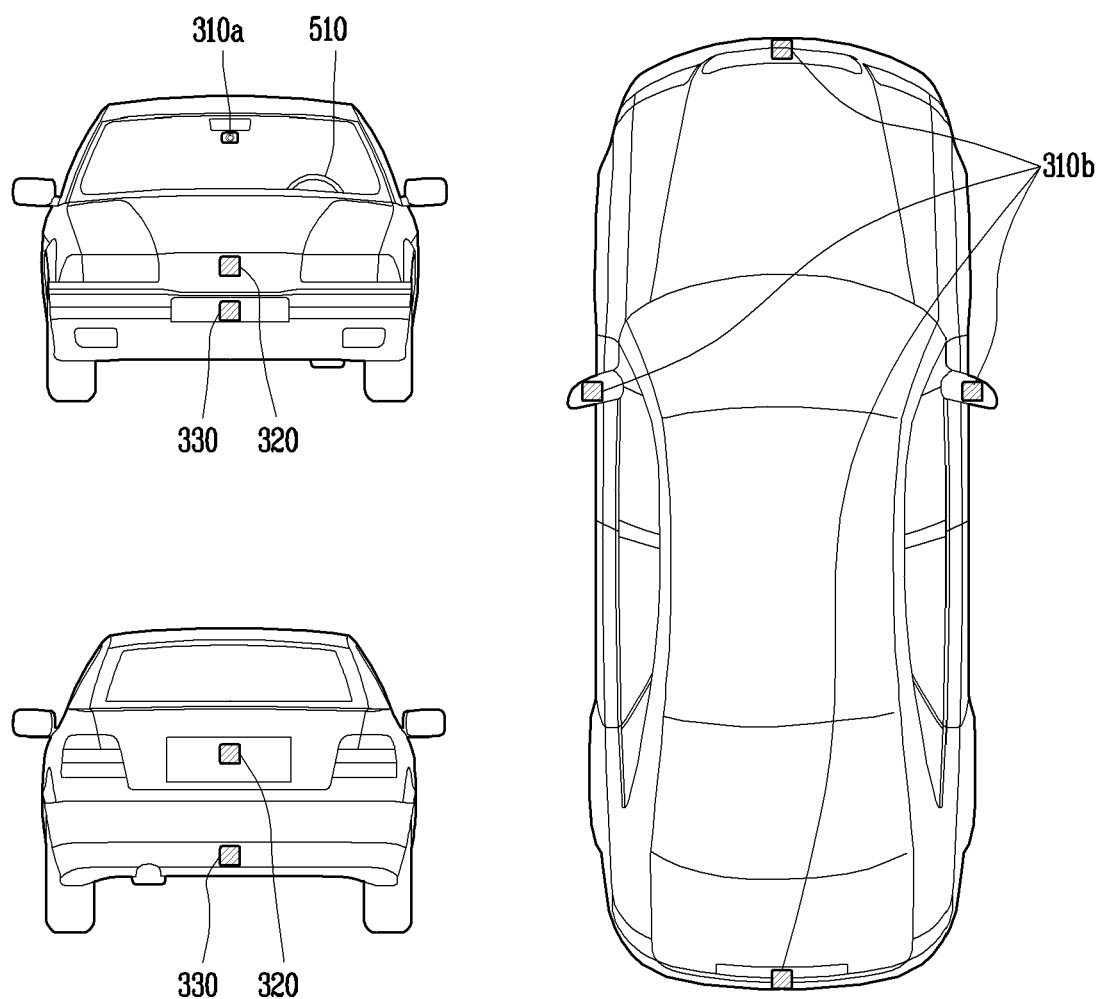
FIG. 2 is a view illustrating appearance of a vehicle at various angles in accordance with an embodiment of the present disclosure.

FIG. 2 is a view illustrating appearance of a vehicle at various angles in accordance with an embodiment of the present disclosure.

Figure 3:
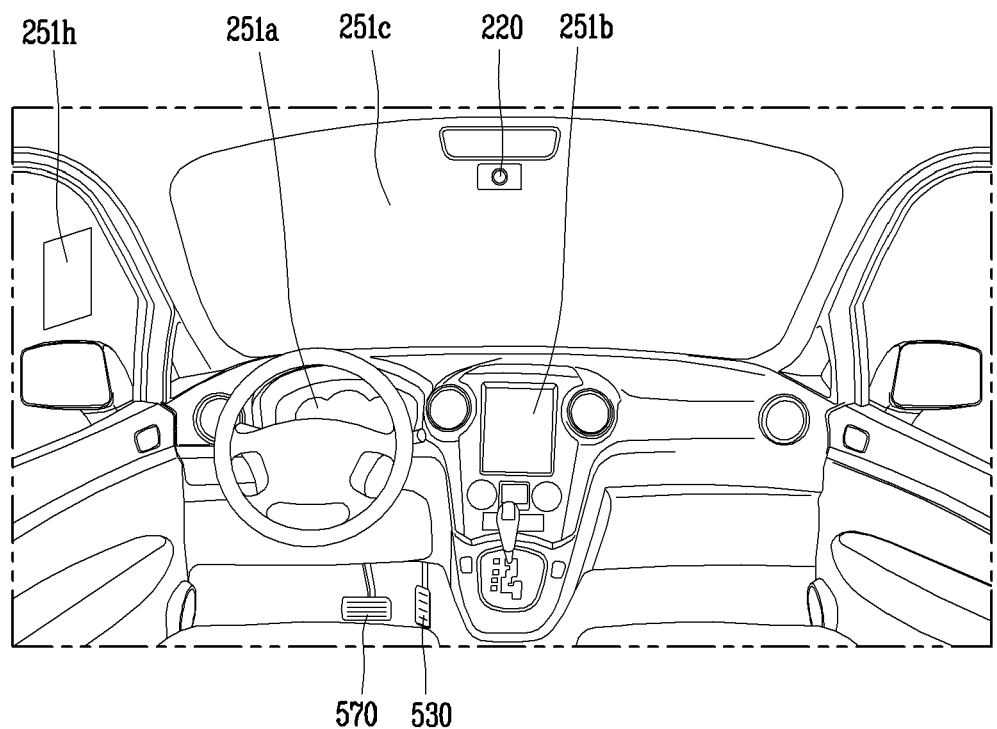
FIGS. 3 and 4 are views illustrating an inside of a vehicle in accordance with an embodiment of the present disclosure.
Figure 4:
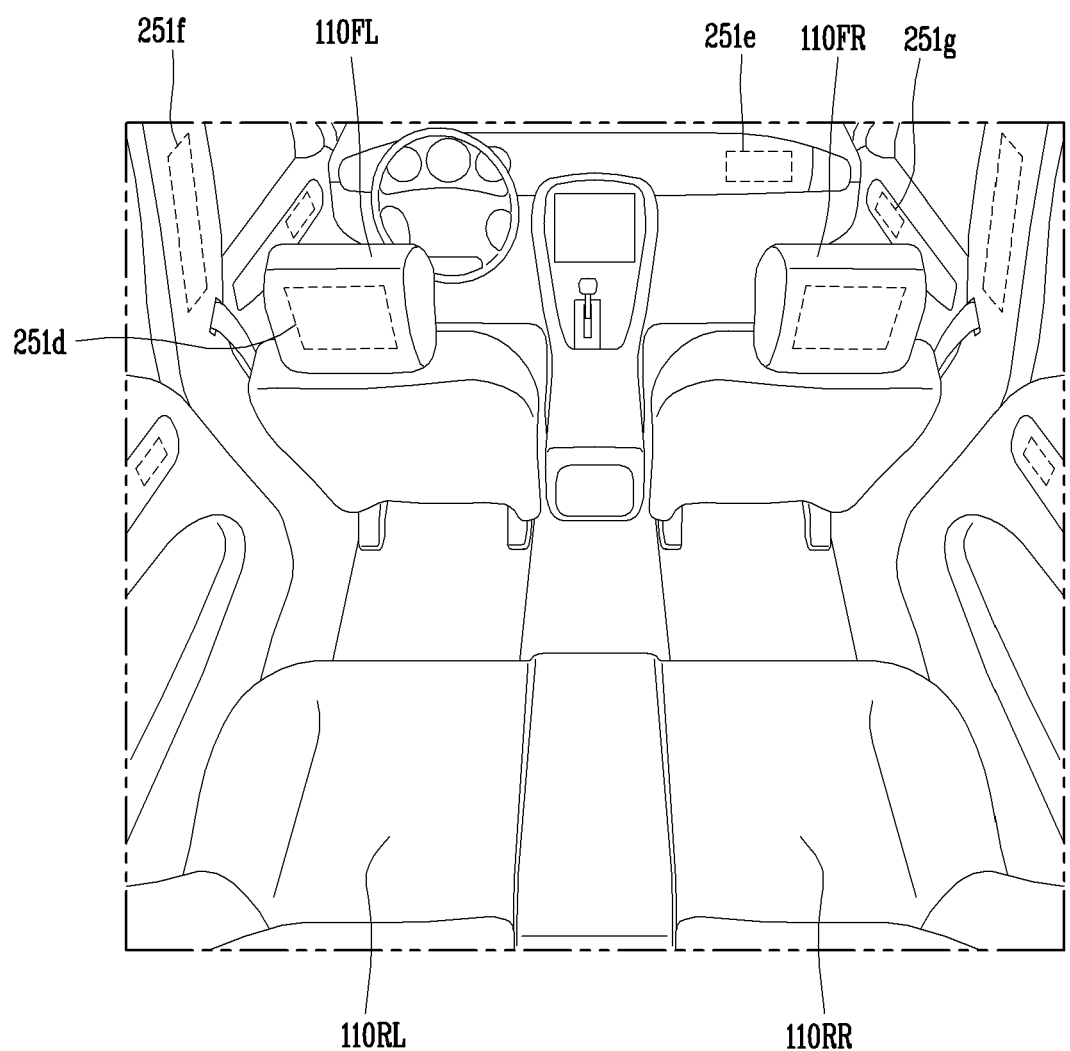

FIGS. 3 and 4 are views illustrating an inside of a vehicle in accordance with an embodiment of the present disclosure.

Figure 5:
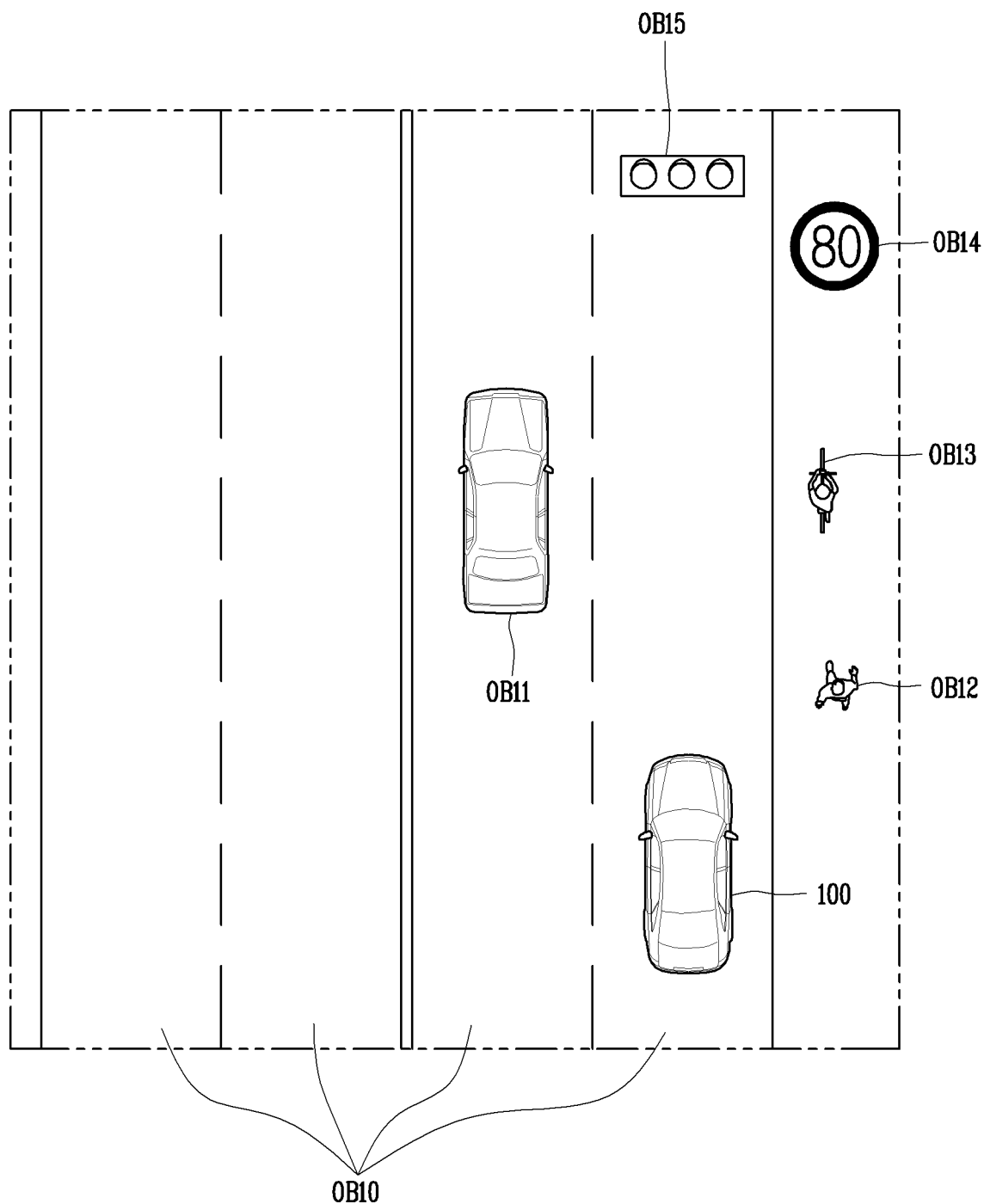
FIGS. 5 and 6 are reference views illustrating objects in accordance with an embodiment of the present disclosure.
Figure 6:
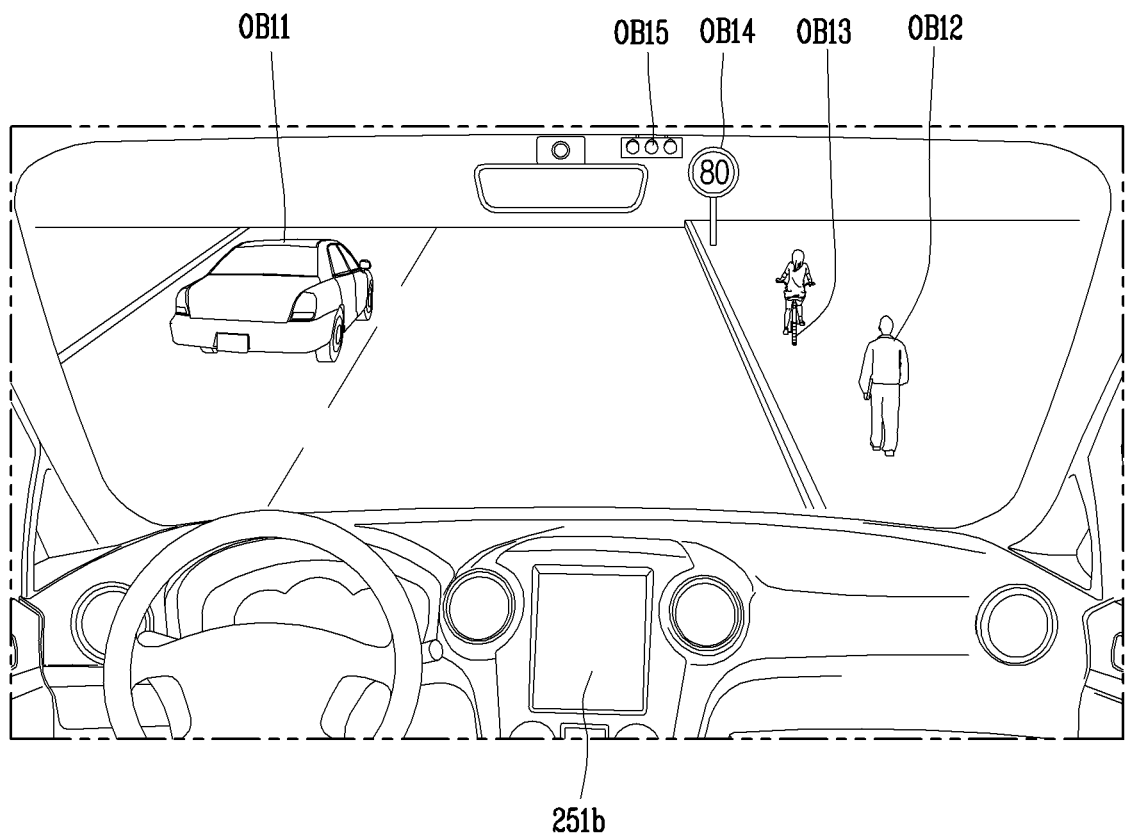

FIGS. 5 and 6 are reference views illustrating objects in accordance with an embodiment of the present disclosure.

Figure 7:
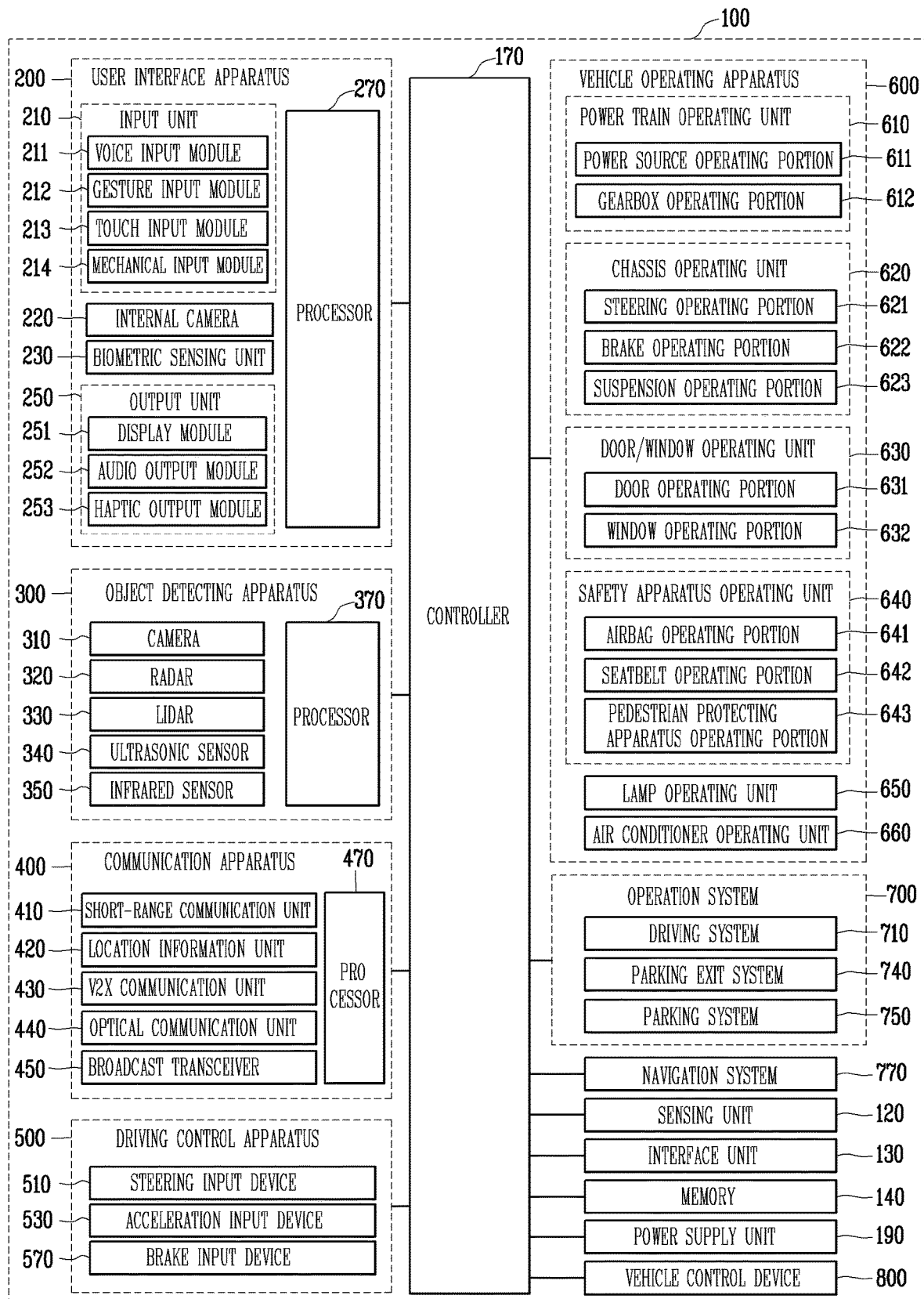
FIG. 7 is a block diagram illustrating a vehicle in accordance with an embodiment of the present disclosure.

FIG. 7 is a block diagram illustrating a vehicle in accordance with an embodiment of the present disclosure.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit (190??).

According to some embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a windshield, one area of a window or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to some embodiments, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to some embodiments, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to some embodiments, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, a light-emitting unit may be integrally formed with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to some embodiments, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to some embodiments, the operation system 700 may further include other components in addition to components to be described, or may not include some of the components to be described.

Meanwhile, the operation system 700 may include a processor. Each unit of the operation system 700 may individually include a processor.

According to some embodiments, the operation system may be a sub concept of the controller 170 when it is implemented in a software configuration.

Meanwhile, according to some embodiments, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to some embodiments, the navigation system 770 may update pre-stored information by receiving information from an external device through the communication apparatus 400.

According to some embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto.

Meanwhile, the interface unit 130 may serve as a path for supplying electric energy to the (a) connected device (apparatus). When the device (appra) is electrically connected to the interface unit 130, the interface unit 130 supplies electric energy supplied from a power supply unit to the connected device( ) according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to some embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 860 may supply power required for an operation of each component according to the control of the controller 170. Specifically, the power supply unit 860 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Descriptions related to the vehicle 100 illustrated in FIGS. 1 to 7 may also be applied to a vehicle 100 described hereinafter. That is, the vehicle 100 according to the present disclosure may include at least one of the components described in FIGS. 1 to 7.

Hereinafter, a robot capable of communicating with a vehicle (or transportation) will be described in detail with reference to the accompanying drawings.

Figure 8:
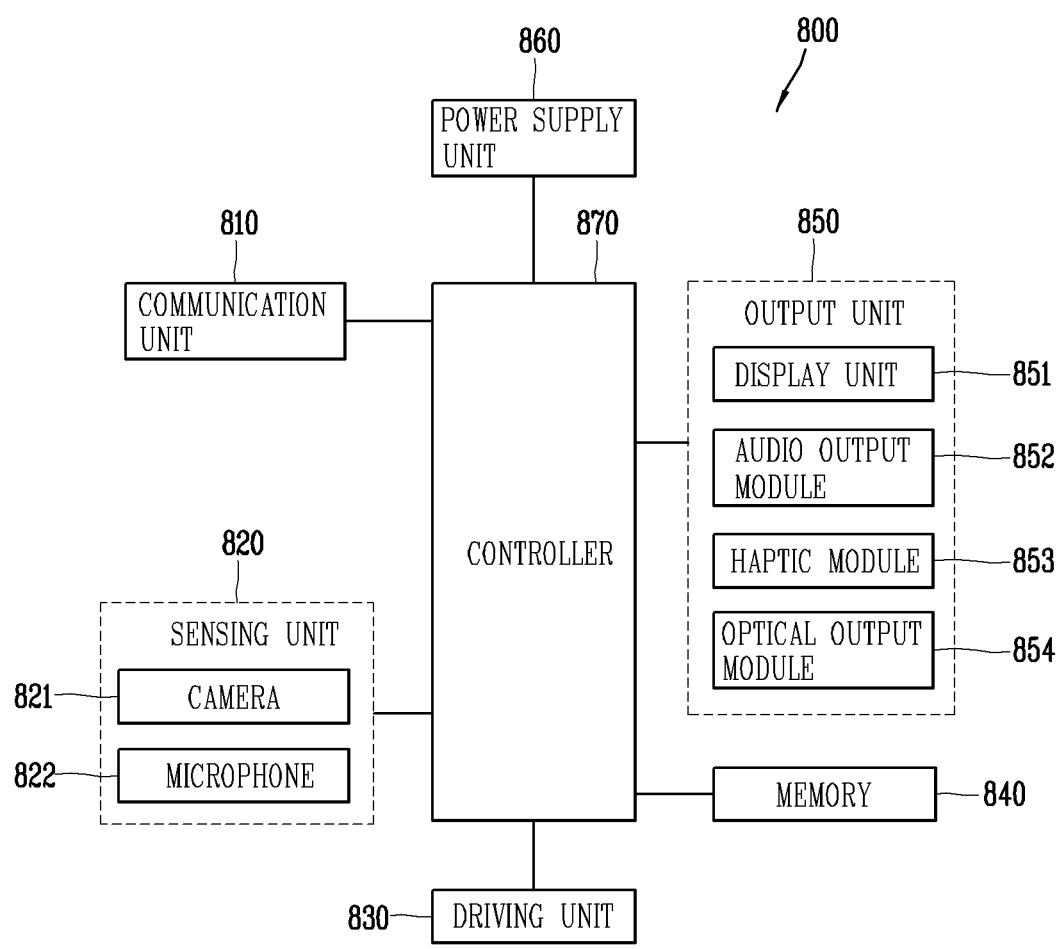
FIG. 8 is a block diagram illustrating a robot according to an embodiment of the present disclosure.

FIG. 8 is a block diagram illustrating a robot 800 according to an embodiment of the present disclosure.

Referring to FIG. 8, the robot 800 according to this embodiment of the present disclosure is controlled by a controller 870, and may include a communication unit 810, a sensing unit 820, a driving unit 830, a memory 840, an output unit 850, a power supply unit 860, and the like connected to the controller 870. Those components illustrated in FIG. 8 are not essential for implementing the robot 800, so the robot 800 described in this specification may be provided with more or less components than the components listed above.

More specifically, the communication unit 810 may include one or more modules for enabling communications between the robot 800 and another device. Here, the another device may be various types of devices provided inside and outside of a vehicle 100, or may be a controller for controlling the vehicle 100, or the vehicle 100 itself.

The sensing unit 820 may include at least one sensor for detecting a surrounding situation of the robot 800. Such a sensor may include a camera 821 capable of sensing an image signal. One or a plurality of cameras 821 may be provided. When the camera 821 is provided in plurality, each of the plurality of cameras 821 may be independently operated to sense a respective image signal. In addition, the sensing unit 820 may include a microphone 822 for sensing an audio signal. The image signal sensed by the camera 821 or the audio signal sensed by the microphone 822 may be analyzed by the controller 870 and provided to a user, which can be processed through a control command generated by the controller 870 or input by the user.

Meanwhile, the robot 800 disclosed herein may combine and use information sensed by at least two of these sensors.

The driving unit 830 may be configured to rotate or tilt each component of the robot 800. To this end, the robot 800 may be formed by connecting a plurality of components such as a body, a face, and arms through a connecting portion connecting each of the plurality of components, and include a plurality of actuators driven by the driving unit 830 so as to rotate or move each of the plurality of components. Accordingly, the driving unit 830 may operate at least one of the plurality of actuators under the control of the controller 870. Thus, at least part of the components constituting the robot 800 may be rotated or tilted to generate a motion of the robot 800.

Meanwhile, the memory 840 is implemented to store data to support various functions or features of the robot 800. For instance, the memory 840 may store various application programs or applications executed in the robot 800, data or commands for operations of the robot 800, and the like. Some of these application programs may be downloaded from an external server via wireless communication. Other application programs may be installed within the robot 800 at time of manufacturing or shipping, which is typically the case for basic functions of the robot 800 (e.g., receiving a call, placing a call, receiving a message, sending a message, and the like). Application programs may be stored in the memory 840, installed in the robot 800, and executed by the controller 870 to perform an operation (or function) for the robot 800.

The output unit 850 may typically be configured to output various types of information, such as audio, video, tactile output, and the like. The output unit 150 may be shown having at least one of a display unit 851, an audio output module 852, a haptic module 853, and an optical output module 854.

Meanwhile, the controller 870 controls an overall operation of the robot 800. The controller 870 may provide or process information or functions appropriate for a user by processing signals, data, information and the like, which are input or output by the aforementioned various components, or activating application programs stored in the memory 840.

Also, the controller 870 may control at least some of the components illustrated in FIG. 8, to execute an application program that has been stored in the memory 840. In addition, the controller 870 may control at least two of those components included in the robot 800 to activate the application program.

The power supply unit 860 may be configured to receive external power or provide internal power in order to supply appropriate power required for operating elements and components included in the robot 800. The power supply unit 860 may include a battery, and the battery may be configured to be embedded in the robot 800, or configured to be detachable from the robot 800. Alternatively, the battery may be configured to be recharged from the vehicle 100.

At least part of the components may cooperatively operate to implement an operation, a control or a control method of the robot 800 according to various embodiments disclosed herein. Also, the operation, the control or the control method of the robot 800 may be implemented by activating at least one application program stored in the memory 840.

Hereinafter, a description will be given in more detail of the aforementioned components with reference to FIG. 8, prior to describing various embodiments implemented through the robot 800.

First, the communication unit 810 may include at least one of a mobile communication module, a wireless Internet module, and a short-range communication module.

Here, the mobile communication module can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink PacketAccess), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module refers to a module for wireless Internet access. This module may be internally or externally installed to the robot 800. The wireless Internet module may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink PacketAccess (HSUPA), Long Term Evolution (LTE), LTE-advanced (LTE-A) and the like. The wireless Internet module may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module may cooperate with, or function as, the mobile communication module.

The short-range communication module is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module in general supports wireless communications between the robot 800 and a wireless communication system, communications between the robot 800 and another device, or communications between the robot 800 and a network where another device is located, via wireless area networks. One example of the wireless area networks is a wireless personal area network.

Here, another device may be a wearable device, for example, a smart watch, a smart glass or a head mounted display (HMD), which is able to exchange data with the robot 800 (or otherwise cooperate with the robot 800). The short-range communication module may sense (or recognize) the wearable device around the robot 800. In addition, when the detected wearable device is a device which is authenticated to communicate with the robot 800, the controller 870, for example, may transfer at least part of data processed in the robot 800 to the wearable device via the short-range communication module. Hence, a user of the wearable device may use the data processed in the robot 800 on the wearable device.

The communication unit 810 may include a location information module. The location information module 800 is a module for acquiring a geographic location (or a current location) of the robot 800. As an example, the location information module includes a Global Position System (GPS) module or a Wi-Fi module. For example, when the robot 800 uses the GPS module, its location may be acquired using a signal sent from a GPS satellite. As another example, when the robot 800 uses the Wi-Fi module, its location may be acquired based on information related to a wireless access point (AP) which transmits or receives a wireless signal to or from the Wi-Fi module. If desired, the location information module may alternatively or additionally perform a function of any of the other modules of the communication unit 810 to obtain data related to the location of the robot 800. The location information module is a module used for acquiring the location (or the current location) of the robot 800, and is not limited to a module for directly calculating or acquiring the location of the robot 800.

Next, the sensing unit 820 is configured to sense image information (or signal) or audio information (or signal), and may be provided with one or a plurality of cameras 821 for an image information input. Such cameras 821 may process image frames of still pictures or video obtained by image sensors in an image capture mode. The processed image frames can be displayed on the display unit 851 or stored in the memory 840. Meanwhile, the cameras 821 provided in the robot 800 may be arranged in a matrix configuration to allow a plurality of images having various angles or focal points to be input to the robot 800. Also, the cameras 821 may be located in a stereoscopic arrangement to acquire left and right images for implementing a stereoscopic image.

The microphone 822 processes an external audio signal into electric audio (sound) data. The processed audio data may be processed in various manners according to a function (or application program) being executed in the robot 800. If desired, the microphone 822 may include assorted noise removing algorithms to remove unwanted noise generated in the course of receiving the external audio signal.

Meanwhile, the sensing unit 820 is configured to sense at least one information of surrounding environment information of the robot 800 or the vehicle 100 and user information, and generate a corresponding sensing signal. The controller 870 may control operations of the robot 800 or execute data processing, a function or an operation associated with an application program installed in the robot 800 based on the sensing signal.

The sensing unit 840 may be implemented using any of a variety of sensors, some of which will now be described in more detail.

A proximity sensor refers to a sensor to sense presence or absence of an object approaching a surface, or an object located near a surface by using an electromagnetic field, infrared rays, or the like without a mechanical contact.

The proximity sensor, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

An ultrasonic sensor may be implemented to recognize location information relating to a touch object using ultrasonic waves. The controller 870, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 821, which has been depicted as a component of the sensing unit 820, includes at least one of a camera sensor (CCD, CMOS etc.), a photo sensor (or image sensor), and a laser sensor.

The display unit 851 is generally configured to output information processed in the robot 800. For example, the display unit 851 may display execution screen information of an application program executing at the robot 800 or user interface (UI) and graphic user interface (GUI) information in response to the execution screen information. The display unit 851 may be configured as a projector for displaying an image by projecting a beam of light. In this case, for displaying the image, the beam of light is projected on a partial or an entire area (region) of a windshield glass, which is used as a screen, from the projector. The area and a position of the windshield glass on which the image is displayed may be determined by the controller 870.

Also, the display unit 851 may be implemented as a stereo display unit for displaying stereoscopic images.

The stereo display unit may employ a 3D display scheme such as a stereoscopic scheme (a glass scheme), an auto-stereoscopic scheme (glassless scheme), a projection scheme (holographic scheme), or the like.

The audio output module 852 may output audio data received from the communication unit 810 or stored in the memory 840. The audio output module 852 may also output an audio signal related to a function performed by the robot 800. The audio output module 852 may also be implemented as a receiver, a speaker, a buzzer, or the like.

The haptic module 853 can be configured to generate various tactile effects that a user feels, perceives, or otherwise experiences. A typical example of a tactile effect generated by the haptic module 853 is vibration. The strength, pattern and the like of the vibration generated by the haptic module 853 can be controlled by user selection or setting by the controller. For example, the haptic module 853 may output different vibrations in a combining manner or a sequential manner.

Besides vibration, the haptic module 853 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 853 can also be implemented to allow the user to feel a tactile effect through a muscle sensation such as the user's fingers or arms, as well as transferring the tactile effect through direct contact. Two or more haptic modules 853 may be provided according to the particular configuration of the robot 800.

The optical output module 854 may output a signal for indicating event generation using light of a light source. The signal output from the optical output module 854 may be generated by emitting light of a single color or a plurality of colors from at least one optical output module 854 formed on the head of the robot 800.

The memory 840 can store programs to support operations of the controller 870 and temporarily store input/output data (for example, voice data, still image data, video data, etc.). In addition, under the control of the controller 870, monitoring information (or data) stored via the camera 821 and the microphone 822 may be stored separately from another monitoring information.

Meanwhile, as aforementioned, the controller 870 may control operations related to application programs and the general operations of the robot 800. The controller 870 may also generate a control command for controlling the vehicle 100 connected to the robot 800 and transmits it to the vehicle 100 via the communication unit 810, enabling at least one of the functions performed by the vehicle 100 to be controlled.

In addition, the controller 870 may monitor inside or outside of the vehicle 100 depending on a vehicle status (state). In this case, the controller 870 may control the driving unit 830 to enable the robot 800 to sense an image inside of the vehicle 100 or to sense an image outside of the vehicle 100. Here, the controller 870 may identify a person or an object approaching within a predetermined distance of the vehicle 100, namely a predetermined area, by using an image received from at least one image sensor provided in the vehicle 100. When the identified person or object moves, the camera 821 of the robot 800 may be controlled to face a different direction depending on a position of the person or object. In this case, the controller 870 controls the actuator to apply an external force to a portion of the robot 800, like the head or the body where the camera 821 is provided, so as to be rotated to a direction toward the person or object.

The controller 870 may provide various functions related to driving when the vehicle 100 is in driving. For example, while the vehicle 100 is travelling, the controller 870 may identify an object, a landmark, and the like corresponding to user's, namely a driver's gaze. Information about the identified object or landmark may be output when requested by the user.

Meanwhile, when the vehicle 100 is stationary, the controller 870 may provide various functions related to stopping or parking. For example, the controller 870 may detect a person or an object approaching the parked vehicle 100, and may capture and store an image according to a sensing result. In addition, the controller 870 may obtain recognition information from a person located outside the vehicle 100, and may identify the person currently located outside the vehicle 100 according to acquired recognition information. When the identified person is a registered person or a passenger permitted to access the vehicle 100, various functions preset by the user may be performed, such as unlocking the vehicle 100, etc.

For this purpose, the controller 870 may have various functions related to (user) authentication. For example, the controller 870 may detect a face of a person from a sensed image and perform authentication based on facial features extracted from the detected face and pre-stored facial features (facial recognition function). Accordingly, the controller 870 may identify whether a driver behind the wheel is the user by comparing pre-stored facial features of the user with the facial features extracted from the face image of the driver behind the wheel, and perform a function according to an identification (verification) result.

Similarly, the controller 870 may extract facial features from a face image of a passenger designated or assigned by the user among the passengers in the vehicle 100. In this case, the extracted facial features information may be registered as authentication information of the passenger designated by the user or the passenger allowed on board the vehicle 100 (hereinafter, referred to as "designated passenger"). Accordingly, the controller 870 may identify the passenger based on the extracted facial features information, and perform various functions specified or permitted by the user according to an identification result.

Meanwhile, as aforementioned, the user or designated passenger authentication can be performed based on a face image of the user or the designated passenger. In this case, the face image may be acquired through the camera 821 of the robot 800 even when the user or the designated passenger is located outside of the vehicle 100. Accordingly, the controller 870 may perform the authentication and execute a function according to an authentication result when the user or the designated passenger is not only located inside of the vehicle 100 but also located outside of the vehicle 100.

In addition to the facial recognition function, the controller 870 may have various recognition functions such as fingerprint recognition, palmprint recognition, or voice recognition. For example, the controller 870 can authenticate or verify the user or the designated passenger through a fingerprint or a palm as well as through the face. In this case, the controller 870 may display an area for entering authentication information through a beam of light projected by the projector, and may recognize the user or the designated passenger through a fingerprint or palm lines sensed from the authentication information input area. Meanwhile, when voice recognition is performed, the controller 870 may display a sentence to be spoken for authentication through a beam of light projected by the projector, and may recognize the user or the designated passenger based on the spoken voice.

Meanwhile, the controller 870 may sense vital signs (or biosignal) of the user through at least one sensor provided in the sensor unit 820. In addition, a user's condition or status may be determined based on the sensed vital signs, and a function for attracting driver's attention such as circulating air in the vehicle 100 or playing music, and the like may be performed based on a determination result. In addition, when the sensed vital signs satisfy preset criteria, information (data) of monitoring inside or outside of the vehicle 100 may be stored. In this case, the stored monitoring information may be stored separately from another information. That is, when the user is greatly startled or gets upset, the controller 870 may store the monitored information separately for later use.

In addition, the controller 870 may control the driving unit 830 so that each of the parts constituting the robot 800 is moved according to a user's action or a user's reaction detected in order for a better interaction with the user. For example, a front surface of the head, that is the face of the robot 800 on which the camera 821 is provided may be rotated or tilted by the controller 870, so as to face the monitoring direction. Further, when the user calls the robot 800 or the like, the robot 800 may respond to the user's call by rotating and tilting its head to face the user.

In addition, the controller 870 may control one component or a combination of those components in order to implement various exemplary embodiments disclosed herein on the robot 800 according to the present disclosure.

The power supply unit 860 receives external power or provides internal power to supply the appropriate power required for operating respective elements and components included in the robot 800 under the control of the controller 870. The power supply unit 190 may include a battery, which is typically rechargeable or be detachably coupled to the terminal body for (re)charging.

As another example, the power supply unit 860 may be configured to recharge the battery in a wireless manner without use of a connection port. In this example, the power supply unit 860 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 9A:
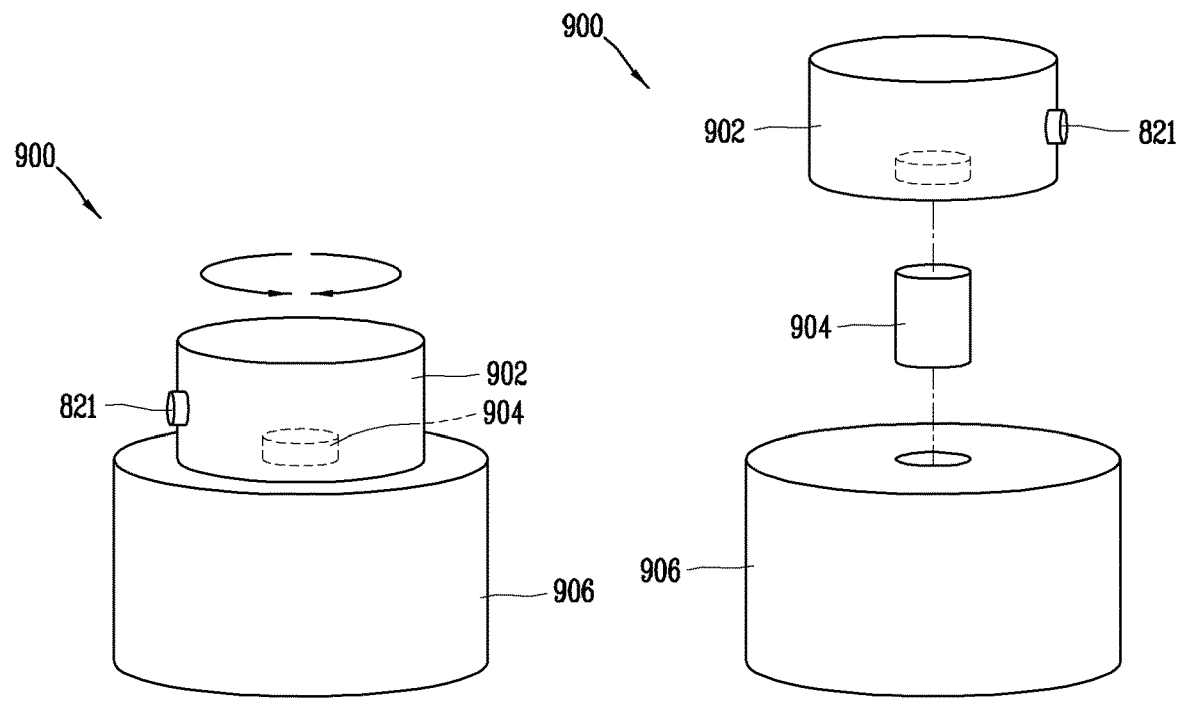
FIGS. 9A to 9C are conceptual views illustrating examples of a structure and appearance of a robot according to an embodiment of the present disclosure.
Figure 9A:
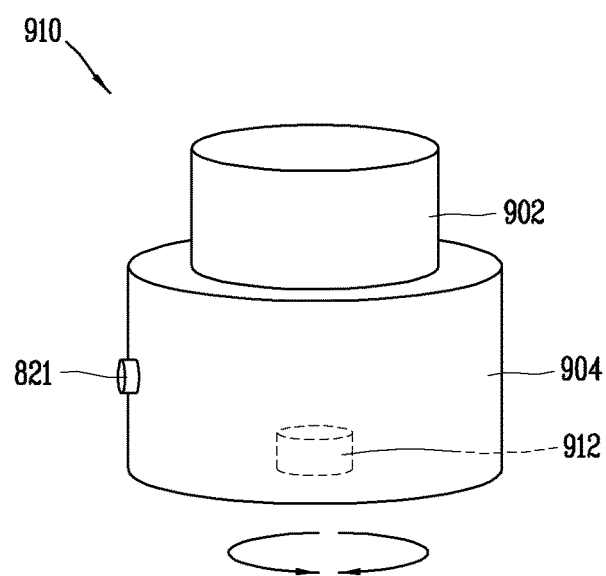
Figure 9B:
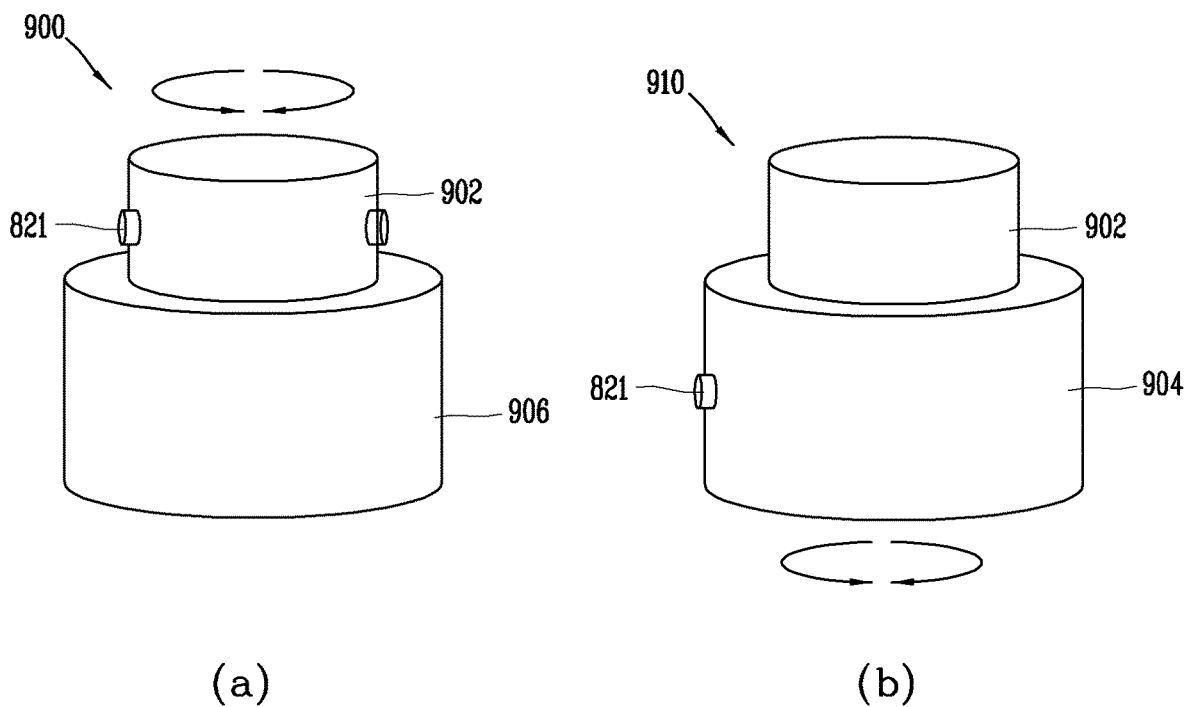
Figure 9B:
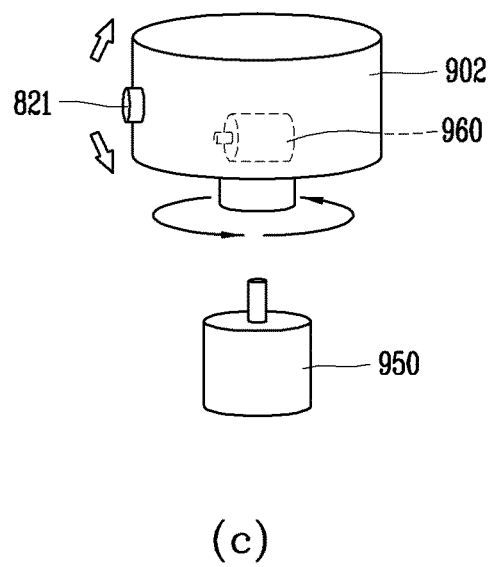
Figure 9C:
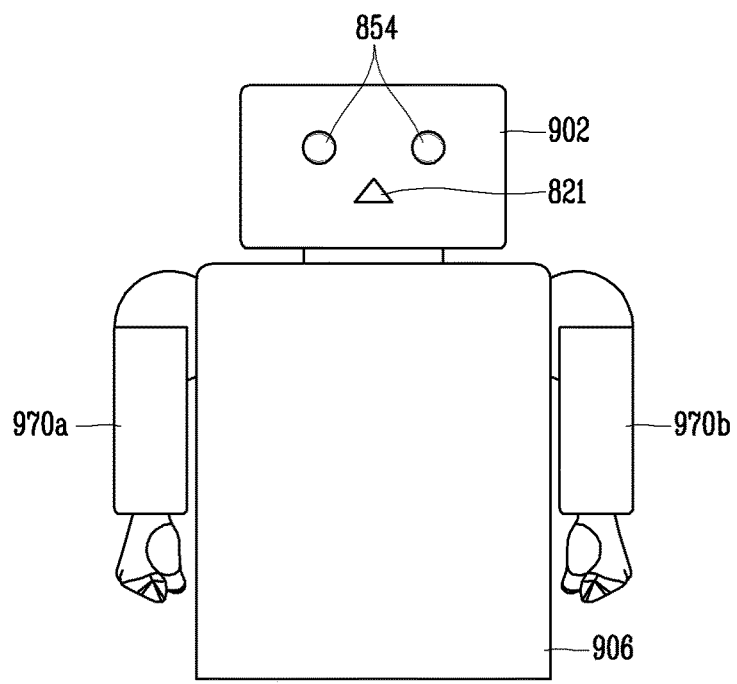
Figure 9C:
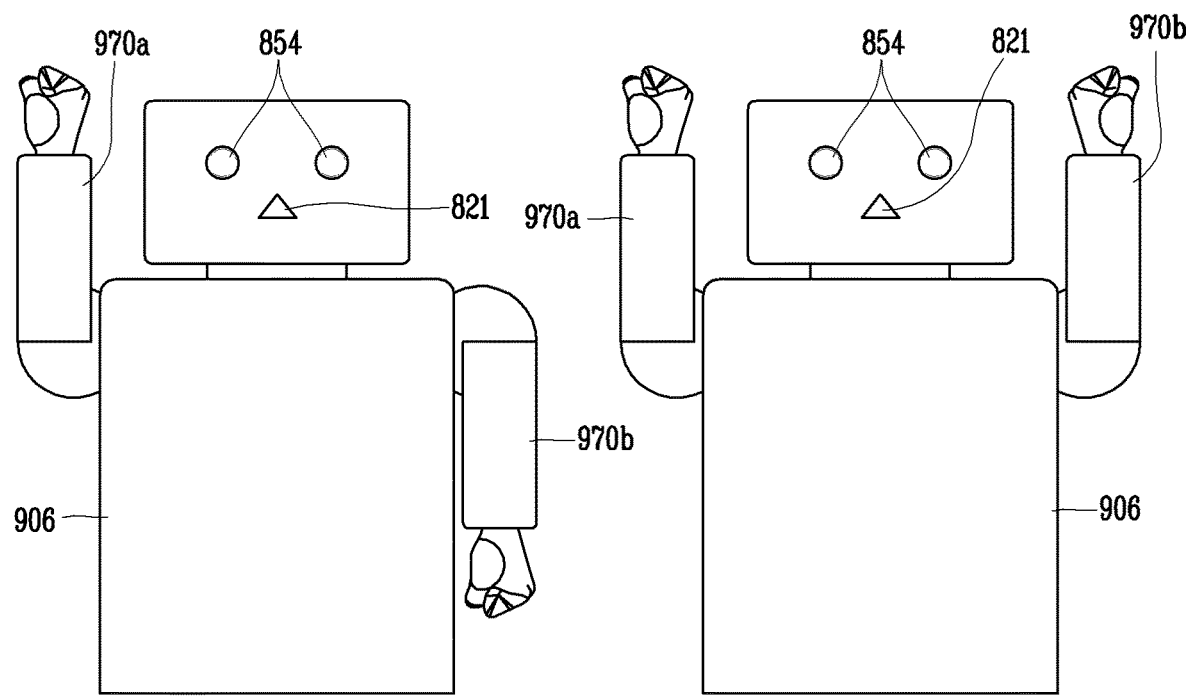

FIGS. 9A to 9C are conceptual views illustrating examples of a structure and appearance of the robot 800 according to an embodiment of the present disclosure.

First, the robot 800 according to this embodiment of the present disclosure may include a head 902, a body 906, and a rotation shaft 904 that connects the head 902 and the body 906 together as shown in FIG. 9A. Here, the head 902 or the body 906 may be defined by a front surface, a rear surface, and side surfaces, and the camera 821 may be provided on at least one of the front surface of the head 902 and the front surface of the body 906. In addition, a portion where the camera 821 is provided may be formed to be rotatable to left and right by a predetermined angle, so that an image sensing direction is changeable with respect to the rotation shaft 904. Thus, an image around the robot 800 may be sensed based on the rotation shaft 904.

First, a description will be given with reference to (a) and (b) of FIG. 9A. In (a) of FIG. 9A, the camera 821 is provided on the head 902 of the robot 800. Here, a portion of the head 902 on which the camera 821 is formed may be the front surface of the head 902.

As such, when the camera 821 is provided only on the front surface of the head 902, the robot 800 may be formed in a manner that the head 902 is only rotatable while the body 906 is fixed. To this end, the body 906 and the head 902 may be connected to each other by the rotation shaft 904, and the rotation shaft 904 may be a neck connecting the head 902 and the body 906 together.

Alternatively, the camera 821 may be formed on the body 906 of a robot 810 as shown in (b) of FIG. 9A. In this case, the controller 870 may control the driving unit 830 to rotate the body 906 by a predetermined angle with respect to the rotation shaft 904, so as to change a monitoring direction of the camera 821.

Here, the body 906 and the head 902 may be integrally formed. In this case, the head 902 may be rotated together with rotation of the body 906. Accordingly, when a sensing direction for monitoring information (image information) is changed according to a monitoring direction, the head 902 of the robot 810 is rotated accordingly, which enables the head 902 of the robot 810 to always keep an eye on the monitoring direction of the robot 810.

However, the body 906 and the head 902 may be operated separately from each other. In this case, the body 906 and the head 902 may be driven differently. In more detail, since the camera 821 is provided on the body 906, the head 902 may not be rotated even when the body 906 of the robot 810 rotates to face the currently set monitoring direction.

Further, when the robot 810 monitors a forward (or front) direction of the vehicle 100 while driving, the head 902 of the robot 810 may be rotated to face another direction even though the body 906 faces the monitoring direction, that is the forward direction of the vehicle 100. Accordingly, when the user calls the robot 810 while driving, the head 902 of the robot 810 is only turned toward the user so that the front surface of the head 902 faces the user, while the body 906 on which the camera 821 is provided keeps an eye on the forward direction. Furthermore, the robot 810 may turn its head 902 toward a passenger when called by the passenger, other than the driver (e.g., the user), while driving.

In the above description, only one camera 821 is provided, however, a plurality of cameras 821 may also be provided as illustrated in (a) of FIG. 9B.

In (a) and (b) of FIG. 9B, a plurality of cameras is provided at the same height. More specifically, (a) of FIG. 9B illustrates an example in which a plurality of cameras is provided on the head 902 of the robot 800, and (b) of FIG. 9B illustrates an example in which a plurality of cameras is provided on the body 906 of the robot 810. The plurality of cameras may be provided to form a predetermined angle with respect to the rotation shaft 904.

Here, the plurality of cameras may be driven independently of each other. Accordingly, images in different directions may be sensed, and thus, two or more different directions can be simultaneously monitored. For example, one of two cameras may monitor the forward direction of the vehicle 100, and the other camera may monitor a blind spot. In this case, the user and the forward direction of the vehicle 100 can be monitored simultaneously by rotating the head 902 toward the user when called or the like. As a result, the camera monitoring the front of the vehicle 100 is directed at the user, and the other camera faces the forward direction of the vehicle 100.

In addition, any one of the two cameras may monitor the forward direction of the vehicle 100, and the other camera may monitor the driver, thereby simultaneously monitoring the forward direction of the vehicle 100 and inside of the vehicle 100.

Meanwhile, the predetermined angle may be approximately 120 degrees. This is because when the robot 800 is installed at the center of a dashboard in a general vehicle that typically features two front seats configuration having a driver's seat and a passenger seat next to the driver's seat, the driver is located at the left or right side of the vehicle, not the center. Accordingly, an angle between the front of the vehicle 100 and the driver from the robot 800 installed position may be approximately 120 degrees.

However, this is just one example of the predetermined angle, and an angle may differ depending on features and types of vehicle. For example, in the case of a single-occupant (or one seater) vehicle without a passenger seat, the predetermined angle may be about 180 degrees. This is because, in the case of the single-occupant vehicle, the driver is located at the center of the vehicle, so that the driver is located behind the robot 800 installed on a dashboard.

Meanwhile, in (a) and (b) of FIG. 9B, two cameras 821 are provided, however, more than two cameras may also be provided. For example, three cameras may be provided at intervals of 120 degrees with respect to the rotation shaft 904. In this case, the three cameras may be controlled such that one monitors the forward direction of the vehicle, and the other two monitor a driver seated in the driver's seat and a passenger seated in the passenger seat, respectively.

In addition, the head 902 of the robot 800 may further include a tilting motor 950 capable of tilting the head 902 as shown in (c) of FIG. 9B. Here, the 'tilting' may be to change a direction of the front surface of the head 902 of the robot 800 to face more upward, as if the robot 800 looks up. Also, the 'tilting' may be to change a direction of the front surface of the head 902 of the robot 800 to face more downward, as if the robot 800 looks down. Due to this tilting function, the head 902 (or the face) of the robot 800 can move up and down like nodding a head. Accordingly, the controller 870 uses the tilting motor 950 and a rotation shaft driving motor 960 connected to the rotation shaft 904 together, and thus the head 902 of the robot 800, more specifically, a direction that the front surface of the head 902 faces can be moved up, down, left, and right. In addition, the tilting motor may be implemented such that the head 902 moves vertically as well horizontally. In this case, the head 902 of the robot 800 may be moved (tilted) not only vertically but also horizontally.

FIG. 9C is an example of appearance of the robot 800 according to an embodiment of the present disclosure, viewed from a front direction.

In the robot 800 according to the present disclosure, two optical output modules 854 having a shape of eyes may be formed on the front surface of the head 902, as illustrated in FIG. 9C. The controller 870 controls the optical output modules 854 to emit light when a user's call is detected or when the user, a registered person or a person designated by the user is recognized, as a way of indicating that the call is detected or recognition is completed.

In addition, when monitoring is performed, the optical output module 854 may be controlled to emit light as a way of indicating that monitoring is being performed. For example, the robot 800, as part of a black-box function, may sense and store an image around the vehicle 100 when the vehicle 100 is turned off and is parked. In this case, when a person or an object approaches within the predetermined distance of the vehicle 100, light is emitted from the optical output module 854 in order to inform that the vehicle 100 is being monitored. In other words, it is possible to eliminate a potential threat to the vehicle 100 by informing the person who approaches the vehicle 100 or the driver of another vehicle that the vehicle 100 in which the robot 800 is installed is being monitored.

Meanwhile, the camera 821 may be provided on the front surface of the head 902. As such, when the camera 821 is installed on the front surface of the head 902, a direction in which the front surface of the head 902 is directed may be changed according to a direction in which an image is sensed by the camera 821, that is, a monitoring direction. As aforementioned, the camera 821 may be provided on the body 906 as well as the head 902. However, the case in which the camera 821 is provided on the front surface of the head 902, as shown in (a) of FIG. 9C, will be described hereinafter, for the sake of explanation.

Although not shown, the body 906 of the robot 800 may include the audio output module 852 for outputting audio data, and the microphone 822 for sensing a user's voice and sound generated inside or outside the vehicle may be provided.

In addition, the robot 800 according to the present disclosure may include arms 970a and 970b connected to the body 906. The arms 970a and 970b may be connected to the body 906 through a connecting shaft, respectively. Also, each of the connecting shafts may be operated by a different rotation shaft driving motor, and each of them may be operated independently from each other. Accordingly, as illustrated in (b) of FIG. 9C, only one arm either 970a or 970b can be rotated to a predetermined angle, like a gesture of lifting one arm. Alternatively, as shown in (c) of FIG. 9C, both arms 970a and 970b may be rotated to a predetermined angle so that the robot 800 may make a gesture of raising both arms.

Meanwhile, such gestures by the robot 800 may be made in line with an output of the optical output unit 854. In more detail, an emotional expression of the robot 800 can be displayed by emitting different lights from the optical output unit 854 and making different gestures using the arms 970a and 970b.

For example, when the user is recognized, the controller 870 of the robot 800 may control the optical output unit 854 so that light is blinking fast while making a gesture of raising both arms. In addition, a voice such as "Pleased to see you again, welcome!" may be output from the audio output module 852, so as to produce an effect like greeting the user recognized. Here, the user may be a robot 800 owner, an owner of the vehicle 100 in which the robot 800 is installed, or a designated (assigned) driver of the vehicle 100.

In the case of a passenger (e.g., a person allowed on board the vehicle 100, or designated passenger), not the user, the robot 800 may lift only one arm, a slight amount of light may be emitted from the optical output module 854, or a simple greeting word such as "welcome" may be output. By doing so, the user may feel that the robot 800 has a deeper interaction with him/her, and thus a bond between the robot 800 and the user may grow.

Meanwhile, the robot 800 may be connected to various devices via the communication unit 810. Here, the various devices may include a mobile terminal of the user. That is, through the mobile terminal of the user, the robot 800 may receive various types of information (or data) stored in the user's mobile terminal, and may store the received information. Also, various functions may be performed according to stored information.

For example, the controller 870 may obtain anniversary information such as a user's birthday or a wedding anniversary, or personal schedule information from personal data stored in the user's mobile terminal. When the user is verified, anniversaries of the user may be celebrated on the day of anniversary based on the current date, or notify the user of the schedule of the day by outputting a voice. In this case, the controller 870 may control the rotation shaft driving motors connected to the optical output module 854 and the arms 970a and 970b, so as to emit light and make a gesture using the arms 970a and 970b.

Meanwhile, the tilting motor and the rotation shaft driving motor may be implemented as actuators. The actuators may be configured to apply an external force to make the head 902 or the body 906 rotate. For example, when the head 902 is formed to be rotatable, the actuator may generate an external force that allows the head 902 to perform a relative motion with respect to the body 906. In addition, the actuators connected to each of the arms 970a and 970b generate an external force to perform a relative motion with respect to the body 906, so that at least one of the arms 970a and 970b moves relative to the body 906. Accordingly, the head 902, the body 906, or the arm either 970a or 970b may be operated by the actuators under the control of the controller 870. Thus, controlling of actuators for rotating or tilting the head 902, the body 906 or the arm (970a or 970b) will be illustrated that the head 902, the body 906, or the arm (970a or 970b) is operated.

Figure 10:
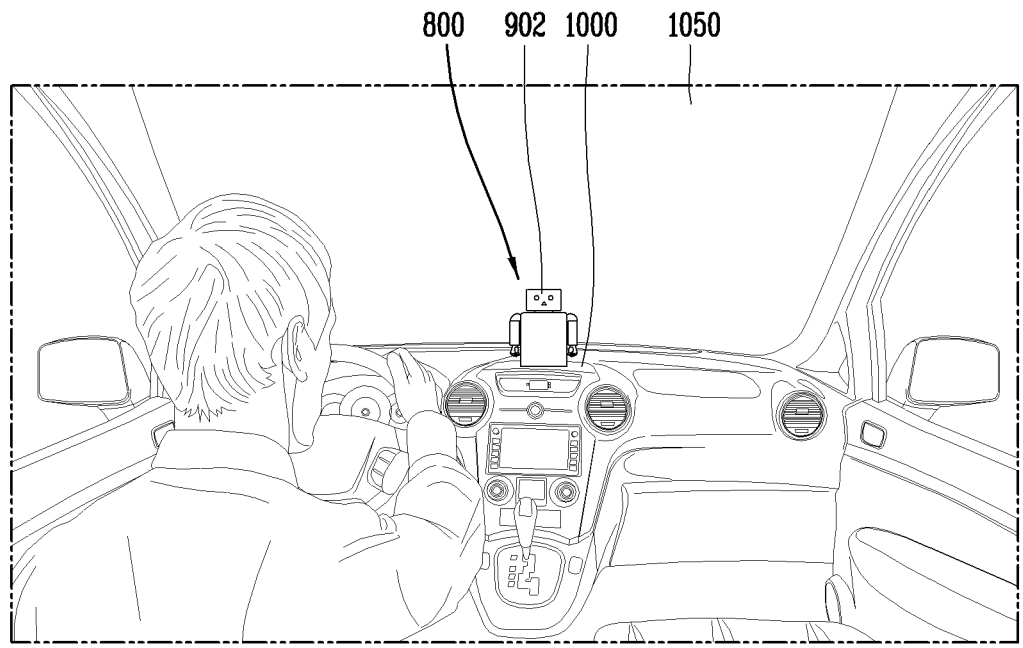
FIG. 10 is a conceptual view illustrating an example of a robot installed in a vehicle, in accordance with an embodiment of the present disclosure.
Figure 10:
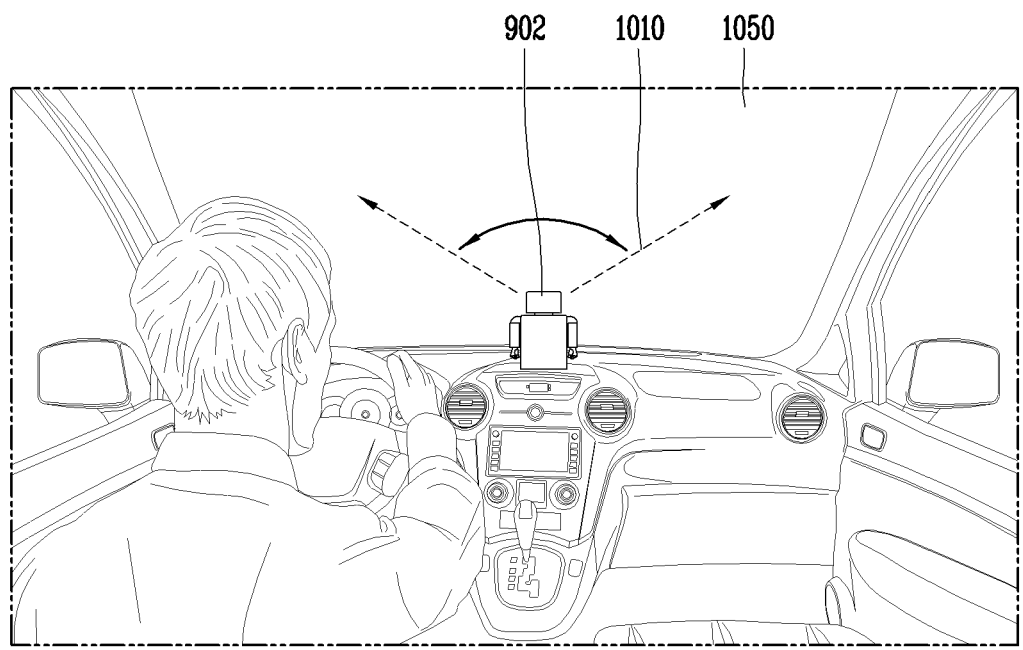

FIG. 10 is a conceptual view illustrating an example in which the robot 800 is installed in a vehicle, in accordance with an embodiment of the present disclosure.

First, as illustrated in (a) of FIG. 10, the robot 800 according to this embodiment of the present disclosure may be installed on a dashboard 1000 formed below a windshield glass 1050 of the vehicle 100. Inside or outside of the vehicle 100 may be monitored according to a vehicle status, that is, according to whether the vehicle 100 is driving, and whether a driver behind the wheel is the user.

In (a) of FIG. 10, an example in which the robot 800 monitors inside of the vehicle 100 is illustrated. In this case, the front surface of the head 902 of the robot 800 on which the optical output module 854 and the camera 821 are formed may be directed toward inside of the vehicle 100. Thus, information sensed from inside of the vehicle 100 may be collected and stored. For example, the robot 800 may identify the driver behind the wheel through monitoring inside of the vehicle 100, and may provide a different function according to whether the identified driver is the user.

In (b) of FIG. 10, an example in which the robot 800 monitors outside of the vehicle 100 is illustrated. In this case, as illustrated, the front surface of the head 902 of the robot 800 may face a driving direction of the vehicle 100, that is, a forward direction of the vehicle 100. Meanwhile, the head 902 of the robot 800 may turn to left and right as described above, and accordingly, a direction in which the head 902 of the robot 800 faces, that is, a gaze (scan) direction 1010 of the robot 800 may be changed to the left or right.

Figure 11:
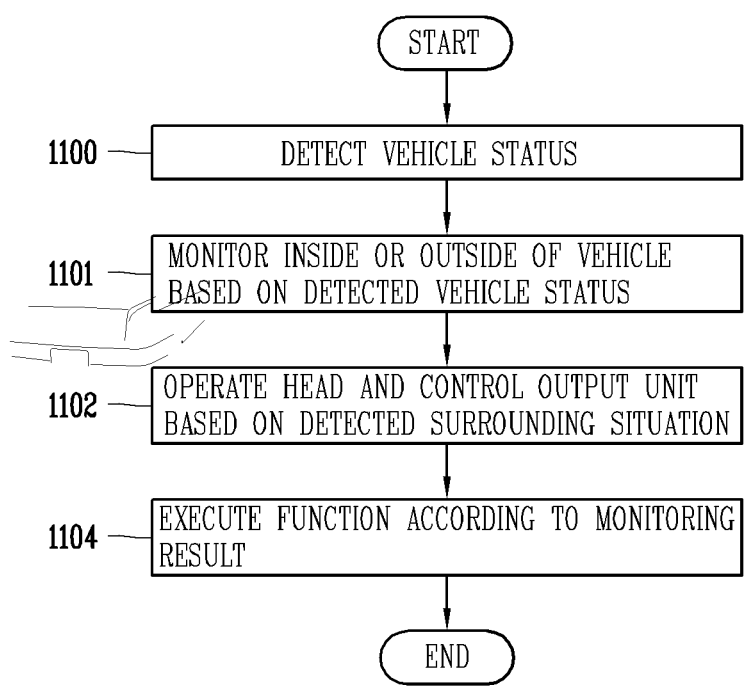
FIG. 11 is a flowchart illustrating a method of controlling a robot according to an embodiment of the present disclosure.

FIG. 11 is a flowchart illustrating a method of controlling a robot 800 according to an embodiment of the present disclosure.

Referring to FIG. 11, the controller 870 of the robot 800 may detect a status of the vehicle 100 connected to the robot 800 (S1100). For example, the step 1100 may be a step for determining whether the vehicle 100 is in driving. Here, the driving status of the vehicle 100 may be determined according to whether an engine of the vehicle 100 is running. That is, when the vehicle engine is turned on, the robot 800 may determine that the vehicle 100 is travelling, and when the vehicle engine is turned off, the robot 800 may determine that the vehicle 100 is stationary.

In this case, when the vehicle 100 is stationary, that is, the engine of the vehicle 100 is turned off, the controller 870 may control such that at least one function and device provided in the vehicle 100 to be operated even when the vehicle engine is turned off. For example, the robot 800 may control such that at least one sensor is on in order to detect a person or an object approaching the vehicle 100 even when the vehicle engine is turned off, and the black-box function for collecting and storing data of monitoring around the vehicle 100 is activated. To this end, the controller 870 of the robot 800 may selectively control at least one function and device of the vehicle 100 while the vehicle engine is turned off, which may also be referred to as a low power mode.

In addition, the step 1100 may be a step for detecting whether a person gets in or out of the vehicle 100. In more detail, even if the engine is not turned off, the controller 870 may determine that a passenger is in the vehicle 100 or is getting out of the vehicle 100 when the door is opened while the vehicle 100 is stationary. As described above, the step 1100 may be for sensing the vehicle's driving status, and detecting changes occurred inside and outside of the vehicle 100.

In addition, the step 1100 may be for determining a driving mode of the vehicle 100. In this case, the controller 870 may detect whether the vehicle 100 is in an autonomous driving mode or a manual driving mode (in which the vehicle is driven by the driver) at the step 1100.

Meanwhile, when the vehicle status is detected in step 1100, the controller 870 may monitor inside or outside of the vehicle 100 according to a detected vehicle status (S1101).

When the vehicle 100 is in driving, the controller 870 may, basically, monitor an external driving environment of the vehicle 100. Accordingly, the controller 870 may control the head 902 of the robot 800 to face toward the forward direction of the vehicle 100, and when there is a building, another vehicle or a person passing by to the front right or the front left of the vehicle 100, the head 902 may be controlled to be rotated, so as to detect the building, the another vehicle, or the person. Accordingly, the head 902 of the robot 800 may be turned to the front left or the front right of the vehicle 100 as the vehicle travels forward, as if the robot 800 looks around. Here, a rotation speed of the head 902 of the robot 800 may be determined according to a speed of the vehicle 100. That is, when the speed of the vehicle 100 is slower than or equal to a preset speed, the head 902 may be rotated at a slow speed since objects around the vehicle 100 in which the robot 800 is installed seem to move slowly.

On the other hand, when the speed of the vehicle 100 exceeds the preset speed, objects around the vehicle 100 in which the robot 800 is installed seem to move faster, so that the head 902 may be rotated at a faster speed. Meanwhile, when the head 902 is formed to be movable up and down and/or left and right like tilting as well as rotation, or when the head 902 is formed to be movable through other configurations, a moving speed and a moving distance of the head 902 may be determined based on a traveling (driving) speed of the vehicle 100.

When changes, for example a passenger (driver) is getting in or getting out of the vehicle 100, are detected in the step 1100, the controller 870 of the robot 800 may monitor inside of the vehicle 100. In this case, the controller 870 may control the head 902 of the robot 800 to face inside of the vehicle 100, and may identify the driver and the passenger detected from inside of the vehicle 100.

In this case, the controller 870 may identify whether the driver is the user from an image of the driver. Here, the user may be the owner of the robot 800 or the vehicle 100 in which the robot 800 is installed, or may be a registered user of the robot 800 or the vehicle 100.

On the other hand, when the driver of the vehicle 100 is not the user, that is, a non-registered user (driver), the controller 870 of the robot 800 may continuously monitor inside of the vehicle 100. Here, the non-registered driver may mean a substitute driver, a valet parker, or the like. In this case, an image of the driver may be sensed and stored through the camera 821 of the robot 800.

However, when the identified driver is determined to be a registered user, the external driving environment may be monitored again. At this time, the head 902 of the robot 800 may be controlled to face the forward direction of the vehicle 100 again.

In addition, the controller 870 may monitor inside or outside of the vehicle 100 depending on the presence of another occupant. In other words, when the driver is the registered user and there is another person in the vehicle 100, the robot 800 may monitor inside of the vehicle 100. However, if there is no passenger except the driver, the external driving environment may be monitored again.

Further, the controller 870 may monitor inside or outside of the vehicle 100 according to the driving mode. That is, when the vehicle 100 is in the autonomous driving mode, the robot 800 may monitor inside of the vehicle 100. In contrast, when the vehicle 100 is in the manual driving mode, the robot 800 may monitor the external driving environment.

The controller 870 may monitor the driver behind the wheel even though the driver is the user of the robot 800 or the vehicle 100, when preset criteria is satisfied. For example, when the user calls the robot 800, the controller 870 may monitor the user, so as to receive a command from the user. Alternatively, the user may be monitored when the user makes a phone call while driving. The user may also be monitored when a shock, vibration or a temperature rise higher than a predetermined level is sensed in the vehicle 100. This is to send a monitoring result of the user to a rescue team or his/her acquaintance in case of an accident, so that the user can be rescued faster. In this case, location information of the robot 800 may also be transmitted together. When monitoring the user, the controller 870 may control the head 902 of the robot 800 to face inside of the vehicle 100, that is, the user.

Meanwhile, the vehicle 100 is determined to be stationary in the step 1100, for example, the vehicle 100 is turned off, the controller 870 may monitor a situation (environment) around the vehicle 100 through the black-box function. For example, the controller 870 may detect a person or an object approaching within the predetermined distance of the vehicle 100. Then the head 902 of the robot 800 is operated (controlled), so that the front surface of the head 902 of the robot 800 faces toward the person or the object detected for object-oriented monitoring. This is because the head 902 of the robot 800 is configured to be rotated and tilted as described above, and thus has a strong directivity. Accordingly, for example, when another vehicle is parking next to the vehicle 100, the entire process of parking is continuously monitored, that is during the parking of the vehicle and after a driver of the another vehicle gets out of his/her vehicle after parking. This is to prevent the vehicle 100 from being damaged by the another vehicle, and to store evidence that can be used for determining liability for damage.

Meanwhile, when a plurality of persons or objects within the predetermined distance of the vehicle 100 is detected, the controller 870 may calculate priorities for the plurality of persons or objects. For example, the controller 870 distinguishes between people and objects to determine a type, so as to calculate the priorities based on at least one of the determined type, a size of the persons or the objects, and a moving speed of the persons or the objects. Then the controller 870 controls such that the head 902 of the robot 800 is operated to monitor (or capture) an object with the highest priority among the calculated priorities.

Meanwhile, a person or an object approaching within the predetermined distance of the vehicle 100 is detected, but it is difficult to capture the person or the object, the controller 870 may generate a control command for controlling the vehicle 100 to capture the person or the object approaching. In this case, the generated control command may be transmitted to the vehicle 100 via the communication unit 810, and thus autonomous driving of the vehicle 100 may be performed by the controller 870.

The controller 870 may control such that the head 902 of the robot 800 is operated and audio data is output or light is emitted from the output unit 850 based on a situation detected during the monitoring at the step 1102.

First, when there is a user input while monitoring the external driving environment, the controller 870 may operate the head 902 in response to the user's input. For example, the controller 870 may receive a user's request for checking information about a specific object or landmark while driving. Then the controller 870 may search for the object or landmark in a user's gaze direction and output a search result. To this end, the robot 800 may receive images of eyeballs and pupils of the user from the camera 821 of the vehicle 100, and detect the object or landmark outside the vehicle 100 corresponding to the user's gaze direction from the received images. In this case, the controller 870 may operate the head 902 so as to be directed at the object or landmark detected, that is, the object or landmark in the user's gaze direction, and output a search result of the object or landmark through the audio output module 852.

Meanwhile, the robot 800 according to this embodiment of the present disclosure may further include a projector as the display unit 851. In this case, the controller 870 may project a beam of light onto at least a portion (region) of the windshield glass through the projector, and may output image information through the projected beam of light. That is, the windshield glass may serve as a screen on which image information is displayed.

The image information may correspond to various objects identified from outside of the vehicle 100. For example, the image information may be about another vehicle identified, an object, a building, or a landmark around the vehicle 100 while driving. When a landmark is searched as described above, the controller 870 may display the searched information on the windshield glass through a beam of light projected by the projector. In this case, the information displayed on the windshield glass may be displayed on a position (location) of the object, the building, or the landmark displayed through the windshield glass.

While the image information is being displayed on the windshield glass, when the position of the object, the person, the building, or the landmark displayed through the windshield glass is changed as the vehicle 100 travels forward, the controller 870 may change an area for displaying the image information. Accordingly, the image information displayed area may be changed according to movement of the object, the person, the building or the landmark.

To this end, the controller 870 may calculate a direction of an object, a building, or a landmark in the forward direction of the vehicle 100 based on the view direction from the driver using radial coordinates with respect to the vehicle 100. Then the object, the building, or the landmark corresponding to the user's gaze may be identified based on the calculated direction, and navigation information or geographical information.

Further, positional movement (change) of the identified object, building or landmark displayed through the windshield glass may be detected using a driving (travelling)

speed of the vehicle 100 and the radial coordinates with respect to the vehicle 100. Alternatively, the positional movement of the identified object, building or landmark displayed through the windshield glass may be detected from a result of capturing the windshield glass by the camera 821 of the robot 800.

Meanwhile, the controller 870 may identify a user's touch applied to the windshield glass. A function is activated in response to the touch input. For example, the controller 870 may identify a point of the windshield glass to which the user's touch is applied, based on an image sensed from the windshield glass. If the identified point is a point at which the image information is displayed, image information to be displayed, that is, information of the searched object, building, or landmark may be output as a voice signal or image information.

In addition, the controller 870 may search for information of an object, a building, or a landmark corresponding to the point where the touch input is identified. For example, the controller 870 may identify one that corresponds to a point of the windshield glass touched by the user among an object, a building, and a landmark currently viewed through the windshield glass, based on at least one of the user's gaze, an image sensed from the windshield glass, and a radial coordinate system around the vehicle 100. Then the identified one (either the object, building, or landmark) is searched to output a search result.

Meanwhile, when the situation around the vehicle 100 is monitored through the black-box function, the controller 870 controls the optical output module 854 provided on the head 902 of the robot 800 to emit light, so as to inform a person approaching within a predetermined distance of the vehicle 100 that the vehicle is being monitored as part of the black-box function. In this case, the controller 870 may control the robot 800 so that the front surface of the head 902 where the optical output module 854 is provided is directed at the person or object approaching.

In addition, the controller 870 controls the vehicle to emit at least one light (e.g., an emergency light, a headlight, etc.) based on a distance between the person or the object, which produces an effect of notifying that the vehicle 100 is at a close distance.

Meanwhile, the controller 870 may control the head 902 so that the front surface of the head 902 faces toward the user when a voice signal of the user is sensed. For example, when the user calls the robot 800, the head 902 may be operated such that the front surface of the head 902 is directed at the user to receive a command from the user. Alternatively, when the user makes a phone call while driving, or a shock, vibration or a temperature rise more than a preset level is detected, the controller 870 may control the head 902 of the robot 800 to face inside of the vehicle 100, that is, the user.

The controller 870 may perform a different function according to a monitoring result (S1104).

For example, when a driver is determined to be the registered user through monitoring inside of the vehicle 100, light may be emitted from the optical output module 854, or a voice message is output as a way of expressing welcome. In this case, if the current date is registered user's birthday (or wedding anniversary, etc.), the intensity of light emitted from the optical output module 854 may be increased or the robot 800 may move the arms more. On the other hand, in the case of a non-registered user, the controller may output a voice message requesting safe driving such as 'Please drive safely.'

Meanwhile, when a predetermined situation occurs while the situation around the vehicle 100 is being monitored through the black-box function, monitored data (information) may be directly transmitted to the registered user's mobile terminal. Here, the predetermined situation may be that a shock or vibration greater than a preset intensity, a noise higher than a preset level, or the like.

When a person or an object gets closer to the vehicle 100 while the situation around the vehicle 100 is being monitored through the black-box function, the controller 870 may output a warning or a notification message. For example, the controller 870 may control the vehicle 100 so that an emergency light or a headlight is turned on, or may output a voice message such as 'What can I do for you?'. In case there is a request from the person approaching close to the vehicle 100, a call is transmitted to the mobile terminal of the registered user. When connected, at least one of a video signal and an audio signal sensed from either the camera 821 or the microphone 822 of the robot 800 may be transferred to the user's mobile terminal.

Meanwhile, when the vehicle 100 is turned off, the controller 870 may monitor a situation outside of the vehicle 100. In this case, when the registered user is detected from outside of the vehicle 100, the controller 870 may automatically open the vehicle door so that the user can immediately get in the vehicle 100. For example, the controller 870 may authenticate the user by using a registered voice or gait of the user, or may authenticate the user based on features or characteristics extracted from the user's face (facial recognition).

In this case, the controller 870 may generate a control command for operating any one of various devices of the vehicle 100, so as to notify that the user authentication is successfully completed. The various devices of the vehicle 100 may include a horn, turn signal lights, lamps, or the like in the vehicle 100. Here, the controller 870 may generate a control command in a manner that the various devices are operated differently according to a distance between the recognized (identified) user and the vehicle 100.

Meanwhile, the user authentication may be performed through an object provided by the user, for example, a mobile terminal. In this case, the controller 870 may perform the user authentication when the user's mobile terminal is at the predetermined distance from the vehicle 100, and generate a control command for selectively operating a plurality of devices provided in the vehicle 100 according to an authentication result or a distance between the verified user and the vehicle 100.

As aforementioned, when the registered user is authenticated, the controller 870 of the robot 800 may express a welcoming reaction through various gestures or light emission from the optical output module 854. In case, a plurality of users is registered, the controller 870 may control such that a different welcoming reaction is provided for each user.

Meanwhile, when the situation around the vehicle 100 is monitored through the black-box function, the controller 870 may store data (information) of persons or objects approaching within the predetermined distance of the vehicle 100 from each direction. For the each direction of the vehicle 100, statistics on how many times the vehicle 100 is approached by the persons or objects may be calculated. Based on the calculated number of times, one direction of the vehicle 100, which is the most frequently approached by persons or objects, may be set as a main monitoring direction. Accordingly, when the vehicle 100 is turned off, the controller 870 may operate the head 902 so that the camera 821 is directed at the main monitoring direction.

Meanwhile, when a person approaches the vehicle 100 while the vehicle 100 is parked or stopped (including the vehicle turned off), the controller 870 controls such that the front surface of the head 902 is directed toward the face of the person detected.

For example, in the case of a passenger who has been on board the vehicle 100, the controller 870 senses a face image of the passenger to identify whether the passenger is a passenger designated by the registered user based on facial features extracted from the sensed image. Alternatively, when a face image of the designated passenger is input from the user, the controller 870 may detect facial features for identifying the designated passenger from the input image. Here, the face image of the designated passenger may also be input via the registered user's mobile terminal.

Meanwhile, in case facial features of the designated passenger have been transmitted to the controller 870, the user may reserve the designated passenger in advance under the name of the designated passenger. Alternatively, the user may reserve boarding of the designated passenger through a voice reservation by connecting his/her mobile terminal to the robot 800. In this case, the controller 870 may determine whether the voice command is input from the genuine user based on a recognition result of the user's voice.

As such, when the boarding of the designated passenger is reserved, the controller 870 may sense a face image of a person approaching the vehicle 100, and compare facial features extracted from the sensed image with facial features of the designated passenger. When the vehicle 100 is approached by the designated passenger reserved for boarding, the vehicle door may be unlocked so that the designated passenger can open the door to get in the vehicle 100. In addition, the controller 879 may generate a control command so that a lamp is turned on or a specified buzzer sound is output to notify that the authentication is successfully completed.

As for the designated passenger, available seats and functions may be limited. For example, the designated passenger may only be allowed to sit in the passenger seat or the back seat. In addition, the designated passenger may be allowed to use an AVN (Audio Video System) and an indoor air conditioning system, but may not be allowed to operate functions related to driving control of the vehicle 100. In more detail, when the designated passenger tries to control the vehicle 100, i.e., trying to turn on the vehicle 100, the controller 870 may generate a control command for preventing the vehicle 100 from being driven by the designated passenger. In addition, a notification message of a non-authorized driver may be output.

Meanwhile, even though the designated passenger is not close to the vehicle 100, the controller 870 may output a signal for notifying the designated passenger of a location of the vehicle 100 when the designated passenger is detected. To this end, the controller 870 may generate a control command for operating a horn or light. In this case, as the designated passenger gets closer to the vehicle 100, the controller 870 may generate a control command for selectively controlling a plurality of devices (e.g., a horn, lights, lamps, etc.) provided in the vehicle 100 according to a distance between the vehicle 100 and the designated passenger. This is to help the designated passenger to find the location of the vehicle 100 more easily. In addition, when the designated passenger is sufficiently close to the vehicle 100, a voice alarm (notification) for guiding the designated passenger to get in the vehicle 100 may be output. When the designated passenger gets in the vehicle 100, information for notifying the boarding of the designated passenger may be transmitted to the registered user's mobile terminal.

In the above description, how the robot 800 is operated for monitoring inside and outside of the vehicle 100 according to a configuration of the robot 800 and a sensing result, and how the robot 800 performs a function according to a monitoring result are illustrated.

Hereinafter, various embodiments in which the robot 800 according to the present disclosure monitors inside and outside of the vehicle 100 and performs a function according to a monitoring result will be described in detail with reference to FIGS. 12A to 16.

Figure 12A:
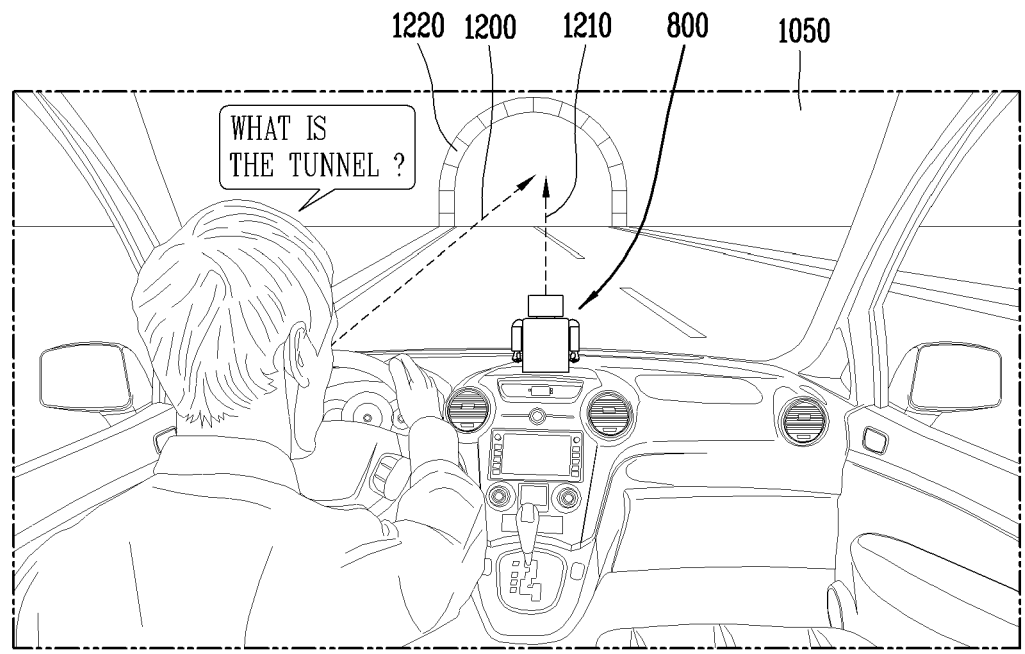
FIG. 12A is a view illustrating an example in which a robot performs interaction with a user, in accordance with an embodiment of the present disclosure.
Figure 12A:
Figure 12A:
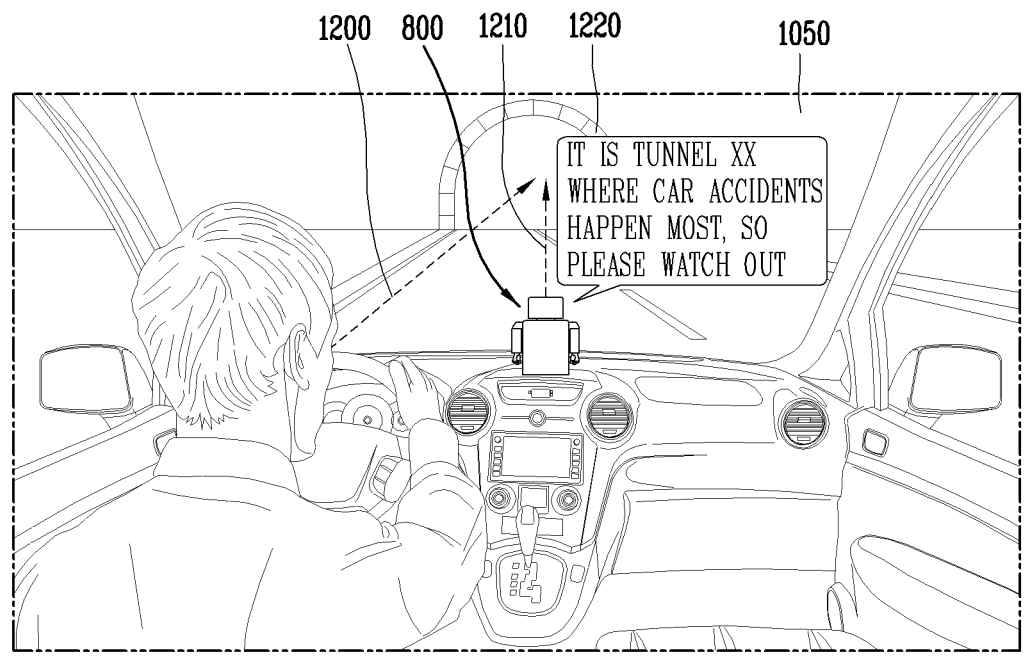
Figure 12B:
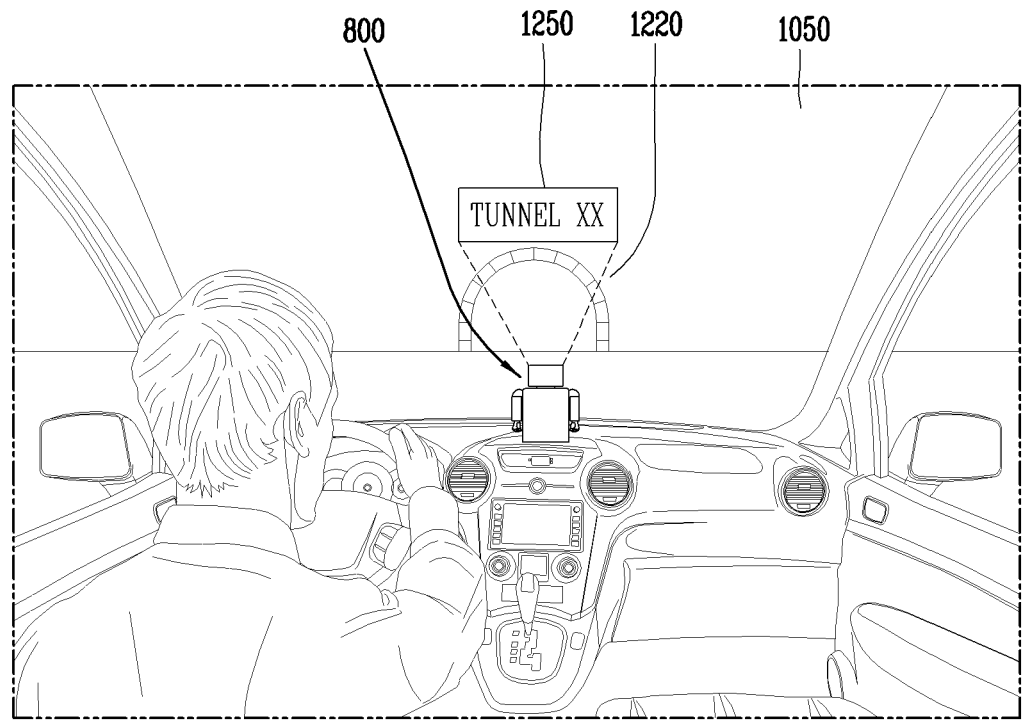
FIG. 12B is a view illustrating an example on how an image displayed area on the windshield of FIG. 12A is changed as a vehicle travels forward.
Figure 12B:
Figure 12B:
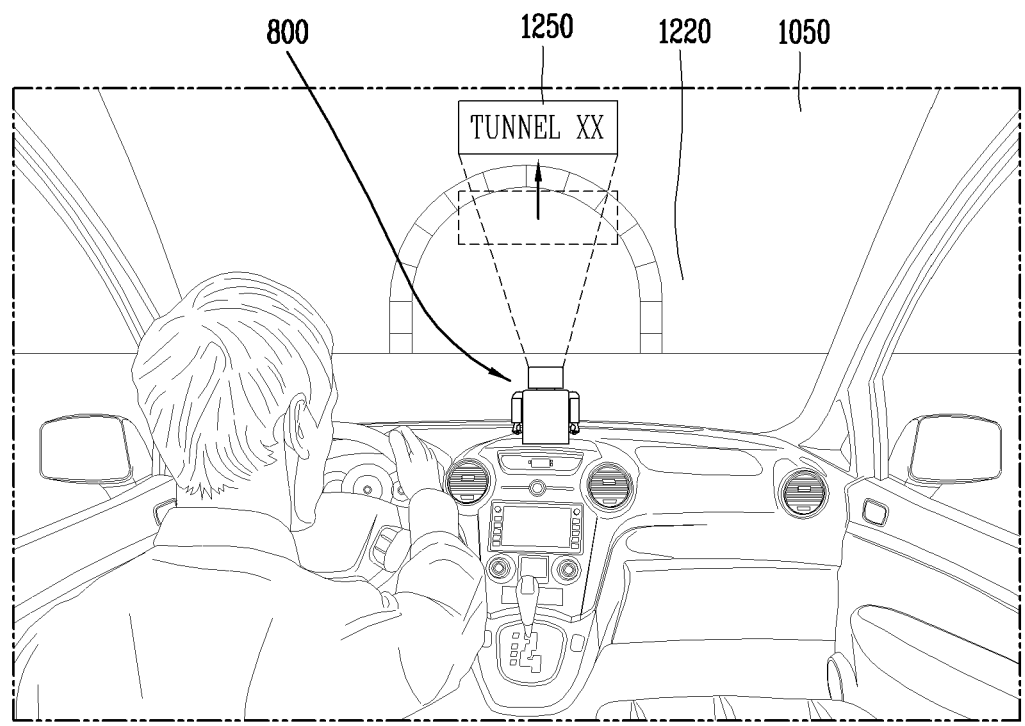

FIG. 12A is an exemplary view illustrating an example in which the robot 800 performs an interaction with a user according to an embodiment of the present disclosure. FIG. 12B illustrates an example on how an image displayed area on the windshield of FIG. 12A is changed as the vehicle 100 travels forward.

First, as illustrated in FIG. 12A, the robot 800 according to the present disclosure is installed on the dashboard 1000, which shows an example of monitoring an external driving environment of the vehicle 100 while driving.

In this case, the controller 870 of the robot 800 may detect a user's (driver's) gaze direction 1200 based on an image of the user's eyeballs and pupils sensed from the vehicle 100. A landmark 1210 corresponding to the user's gaze direction 1200 may be detected based on a radial coordinate system of the vehicle 100. For example, the landmark 1220 may be detected based on geographical information or navigation information. Then the head 902 of the robot 800 may be controlled such that the front surface of the head 902 is directed toward the landmark 1210 detected. Accordingly, as shown in FIG. 12A, the user's gaze direction 1200 and a robot's gaze direction 1210 (a direction in which the front surface of the head 902 faces) are headed to the same landmark 1220 seen through the windshield glass 1050. Thus, the controller 870 of the robot 800 may capture an object detected from the direction viewed by the user through the camera 821 of the robot 800.

In this state, when the user requests information related to the landmark 1220 currently seen, the controller 870 may search for the landmark 1220 detected. Then the controller 870 may output a search result in the form of audio information as illustrated in FIG. 12A.

In the drawing, the search result is output in the form of audio information, however, the information may be output in the form of image information. In this case, the controller 870 of the robot 800 may project an image corresponding to the search result to one portion (area) of the windshield glass 1050 through the projector. In this case, the image information, as illustrated, is displayed on the windshield glass 1050 corresponding to a position of the landmark 1220 (above a tunnel) seen through the windshield glass 1050.

Meanwhile, as the vehicle 100 is traveling forward, the position of the landmark 1220 may be changed constantly. For example, as illustrated, when the landmark 1220 is in a forward driving direction of the vehicle 100, the landmark 1220, i.e., the tunnel, seen through the windshield glass 1050 may be moved to an upper area of the windshield glass 1050 (as it gets closer).

The controller 870 may calculate distance variations and angle variations between the landmark 1220 and the vehicle 100 according to a travelling speed of the vehicle 100. The controller 870 may calculate a movement direction and a movement speed of an image information 1250 displayed position by calculating the movement speed of the landmark 1220 displayed position on the windshield glass 1050, which is generated due to the distance variations, and a movement direction of the landmark 1220 displayed position on the windshield glass 1050, which is generated due to the angle variations. Then the controller 870 may change a position of the image information 1250 displayed area on the windshield glass 1050 according to the calculated movement direction and movement speed. Alternatively, the controller 870 may determine a position for the image information 1250 to be moved by using an image of the windshield glass 1050 sensed by the camera 821 of the robot 800.

Accordingly, when the image information 1250 is displayed above the tunnel 1220 as shown in FIG. 12B, the controller 870 may change the displayed area of the image information 1250 as a position of the tunnel 1220 seen through the windshield glass 1050 is moved as illustrated. Therefore, when a landmark position corresponding to the user's gaze direction is changed as the vehicle 100 is travelling forward, a position of an image information displayed area for the landmark may also be changed accordingly.

Figure 13:
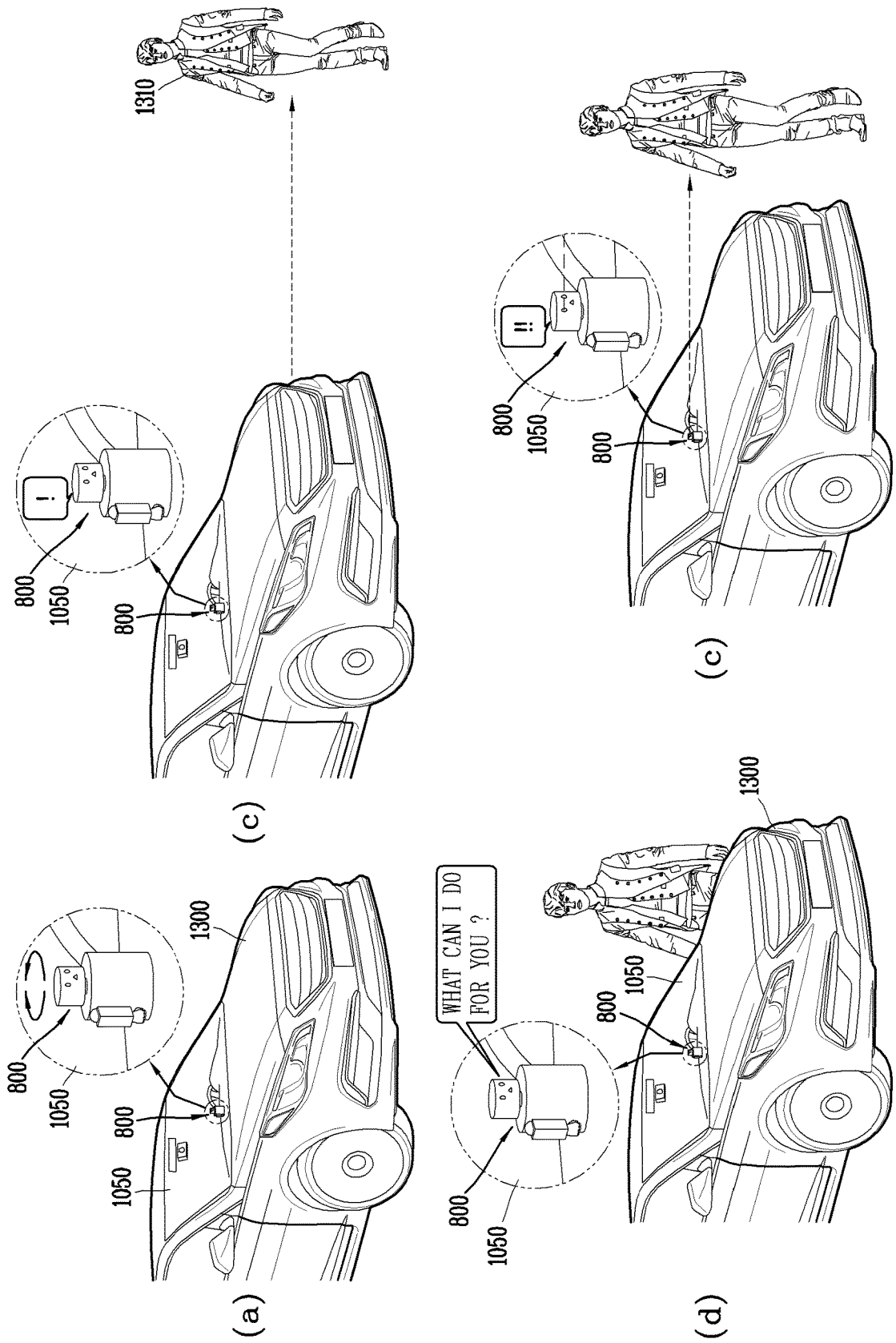
FIG. 13 is a view illustrating an example in which a robot according to an embodiment of the present disclosure performs monitoring outside of a vehicle while parked.

FIG. 13 is an exemplary view illustrating an example in which the robot 800 performs monitoring outside of the vehicle 100 when the vehicle 100 is parked.

First, when the vehicle 100 is parked, that is, when the vehicle 100 is turned off, the robot 800 according to this embodiment of the present disclosure may monitor an external environment of the vehicle 100 through the blackbox function as shown in (a) of FIG. 13

In this state, as shown in (b) of FIG. 13, the controller 870 can detect a person approaching within a predetermined distance (first distance) of the vehicle 100. In addition, the controller 870 may control the robot 800 so that the front surface of the head 902 is directed toward the person sensed.

Meanwhile, when the person detected comes closer to the vehicle 100, for example, when approached by a second distance, which is closer than the first distance, the controller 870 of the robot 800 may inform the person that the vehicle 100 is being currently monitored. For instance, the controller 870 may control such that light is emitted from the optical output module 854. In this case, the optical output module 854 formed in the eyes of the robot 800 may emit light while looking at the person approaching. In addition, the controller 870 may control the camera 821 of the robot 800 to capture an image, so as to be directed toward the person approaching.

Nevertheless, when the person comes even closer to an adjacent distance (third distance), which is closer than the second distance, the controller 870 may output a warning sound or an audio signal to inform the person that the vehicle 100 is currently being monitored while maintaining the object-oriented monitoring. In addition, a call may be transmitted to the user's mobile terminal, so as to transfer the currently monitored data, if necessary.

Meanwhile, as shown in (d) of FIG. 13, the controller 870 may output a voice message to ask the person at the adjacent distance, such as "What brings you here?". In this case, the controller 870 may receive a voice of the person at the adjacent distance through the microphone 822, and output a user's mobile terminal number as an audio signal in response to the received voice, or transfer a call to the user's mobile terminal, so that connection between the user and the person at the adjacent distance is made via the robot 800.

The third distance may be closer than the second distance, and the second distance may be closer than the first distance. The first distance may be a distance that can be sensed by at least one sensor provided in the vehicle 100. A distance equal to or closer than the second distance may be a distance that can be sensed by the sensor unit 820 of the robot 800.

In other words, when the vehicle 100 is turned off, the controller 870 of the robot 800 according to this embodiment of the present disclosure uses at least one sensor provided in the vehicle 100 so as to detect a person at a farther distance, which is undetectable by the sensor unit 820 of the robot 800. Then when the person is at a distance detectable by the sensor unit 820 of the robot 800, light may be emitted from the optical output module 854 of the robot 800 or a sound signal related to monitoring may be output.

Figure 14:
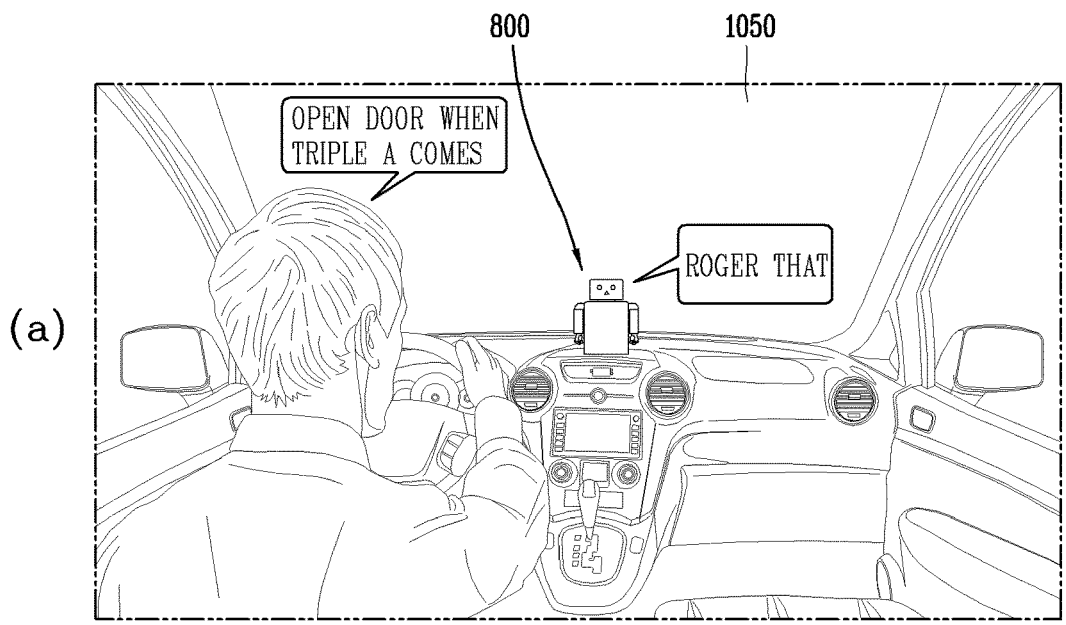
FIG. 14 is a view illustrating an example in which a robot according to an embodiment of the present disclosure recognizes a person located outside of a vehicle and performs a function according to a recognition result.
Figure 14:
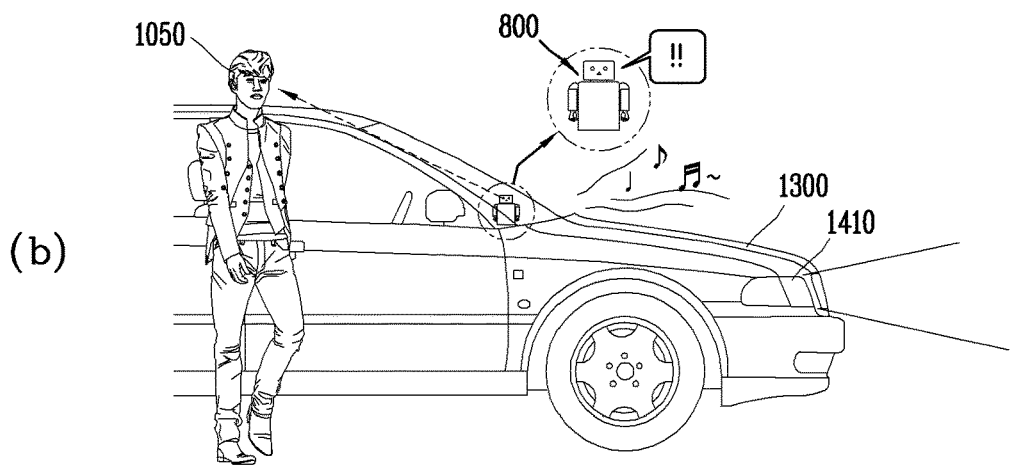
Figure 14:
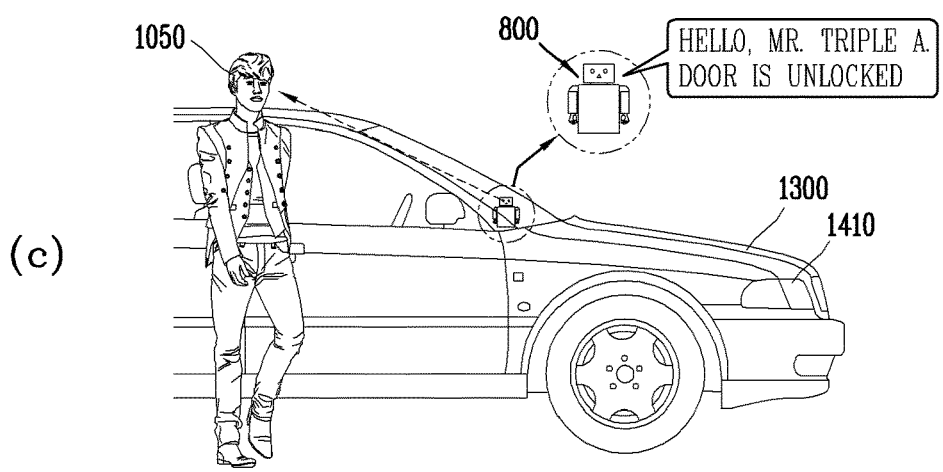

FIG. 14 is an exemplary view illustrating an example in which the robot 800 according to an embodiment of the present disclosure performs (facial) recognition of a designated passenger located outside of the vehicle 100 and executes a function according to a recognition result.

First, (a) of FIG. 14 illustrates an example in which a boarding reservation of the designated passenger is input from the registered user. For example, when facial features information of the designated passenger is pre-stored for authentication, the user can specify the designated passenger using a voice for a boarding reservation.

In this state, the controller 870 of the robot 800 may detect a designated passenger 1450 approaching the vehicle 100 by an image of sensing outside of the vehicle 100. Then the controller 870 may inform a vehicle position using a honk, a headlight 1410, a lamp, or the like. When the designated passenger 1450 gets closer to the vehicle 100, the controller 870 may compare facial features extracted from the sensed face image of the designated passenger 1450 with the stored facial features information of the designated passenger reserved for boarding to verify the designated passenger 1450. When the person approaching is the designated passenger 1450 reserved for boarding, a signal indicating that authentication is successfully completed may be output together with a welcoming reaction. In addition, doors of the vehicle 100 are unlocked to allow the designated passenger 1450 reserved for the boarding to get in the vehicle 100.

Meanwhile, when a seat is specified, the controller 870 may only unlock a door corresponding to the designated seat among the doors of the vehicle 100. In this case, the controller 870 may output a sound signal for guiding the door corresponding to the specified seat, together with the welcoming reaction.

Figure 15:
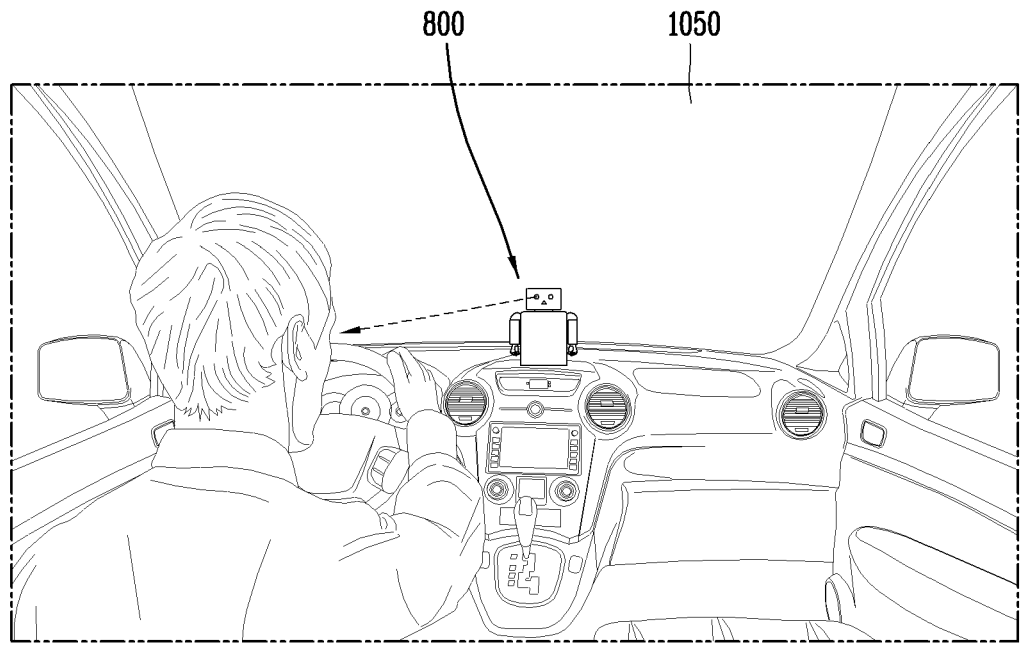
FIG. 15 is a view illustrating an example in which a robot according to an embodiment of the present disclosure recognizes a driver and monitors inside of a vehicle depending on a recognition result.
Figure 15:
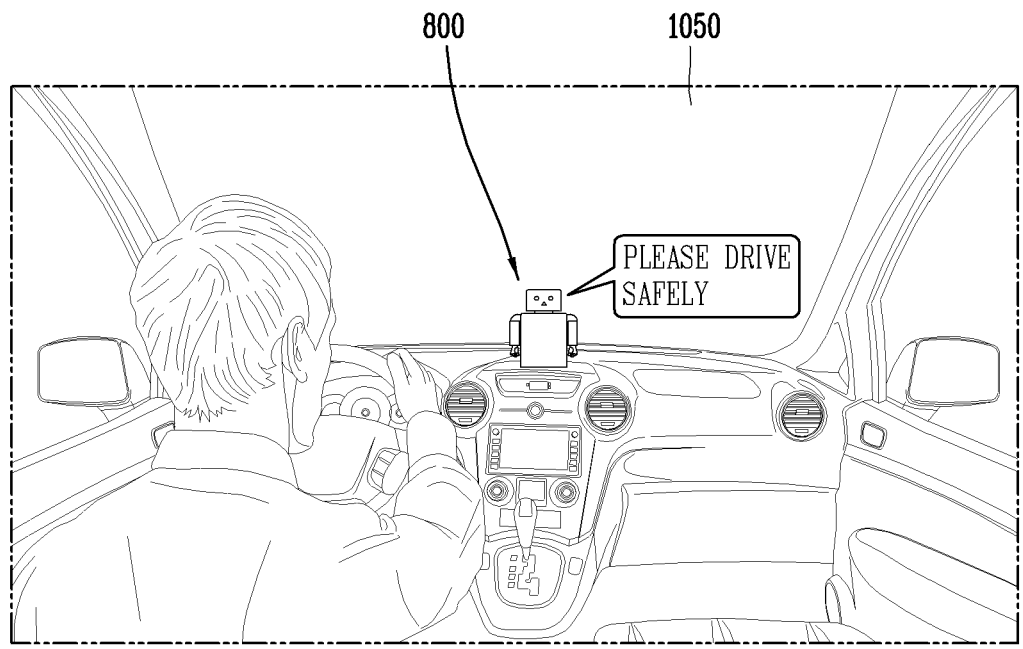

FIG. 15 is an exemplary view illustrating an example in which the robot 800 according to an embodiment of the present disclosure monitors inside of the vehicle 100 depending on a result of driver recognition.

As aforementioned, the controller 870 of the robot 800 according to the present disclosure may identify whether the driver behind the wheel is the registered user. For example, as shown in (a) of FIG. 15, the controller 870 may operate the robot 800 so that the front surface of the head 902 is directed toward the driver's face by monitoring inside of the vehicle 100. Then the controller 870 may identify whether the driver is the registered user by comparing the driver's face sensed by the camera 821 formed on the front surface of the head 902 with facial features of the registered user.

Meanwhile, when the driver is determined to be the registered user according to a recognition result, the controller 870 may perform monitoring while driving, that is, monitoring the external driving environment of the vehicle 100, along with a welcoming reaction. However, according to the recognition result, when the driver is determined to be a non-registered user, inside of the vehicle 100 may be continuously monitored as shown in (b) of FIG. 15, and a voice signal for requesting safe driving may be output. In addition, the driving status of the vehicle 100 may be notified to the registered user.

Meanwhile, as described above, the robot 800 according to the present disclosure may recognize the user in various ways in addition to the face recognition. It has also been mentioned that the robot 800 can project image information through the projector. Accordingly, the robot 800 may display and guide an input area for authentication information through a vehicle window.

Figure 16:
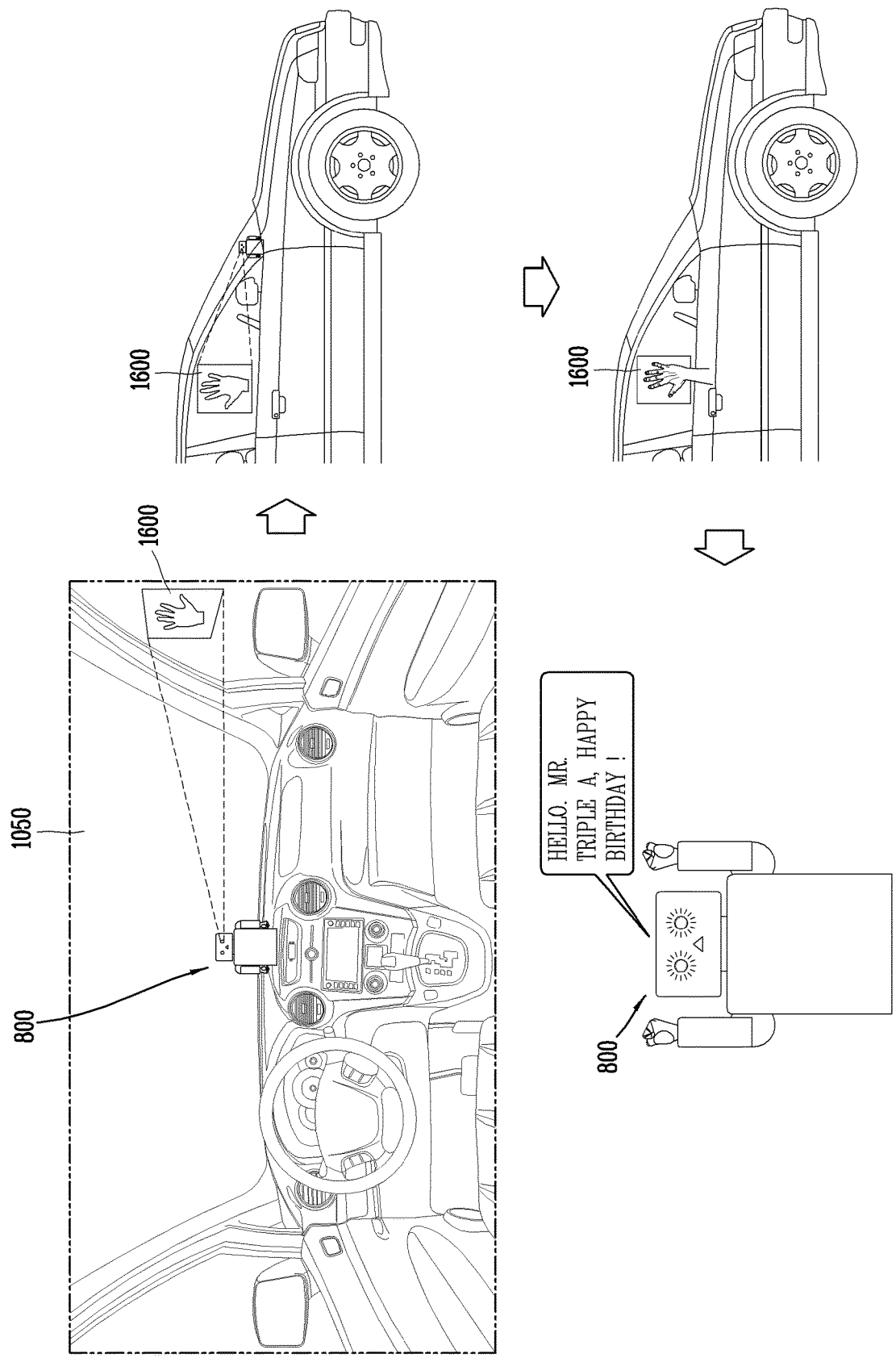
FIG. 16 is a view illustrating another example in which a robot according to an embodiment of the present disclosure recognizes a person located outside of a vehicle and performs a function depending on a recognition result.

FIG. 16 is an exemplary view illustrating another example in which the robot 800 according to the present disclosure recognizes a person located outside of the vehicle 100 and executes a function depending on a recognition result. In the following drawings, the upper left to the upper right and the lower right to the lower left will be described in order, and the upper left drawing is referred to as a first drawing, the upper right drawing is referred to as a second drawing, the lower right drawing is referred to as a third drawing, and the lower left drawing is referred to as a fourth drawing.

First, an example will be described with reference to the first drawing of FIG. 16. In the first drawing of FIG. 16, guide information 1600 related to a user authentication information input is projected onto a passenger seat window through the projector of the robot 800 as a person requesting authentication is detected from outside of the vehicle 100.

In this case, when a required user authentication is implemented through a hand or a fingerprint, the guide information 1600 may be displayed as a shape of hand or finger as shown in the second drawing of FIG. 16.

Accordingly, as shown in the third drawing of FIG. 16, when a hand or a finger of the person touches the guide information 1600 displayed on the passenger seat window, the user authentication can be performed based on a hand shape (or palm lines) or fingerprint of the finger. When verified successfully, the controller 870 of the robot 800 may output a welcoming reaction as shown in the fourth drawing of FIG. 16.

Meanwhile, the controller 870 of the robot 800 according to this embodiment of the present disclosure may output a message or a sound together with the welcoming reaction on the day of birthday or schedule, when the user inputs anniversaries or schedules, or when information about anniversaries or schedules are input through the user's mobile terminal. Thus, if the current date is a birthday of the authenticated user, the robot 800 may output a birthday congratulatory message or a happy birthday melody as shown in the fourth drawing of FIG. 16.

Meanwhile, the robot 800 according to this embodiment of the present disclosure may provide a Driver Status Monitoring (DSM) function.

Figure 17:
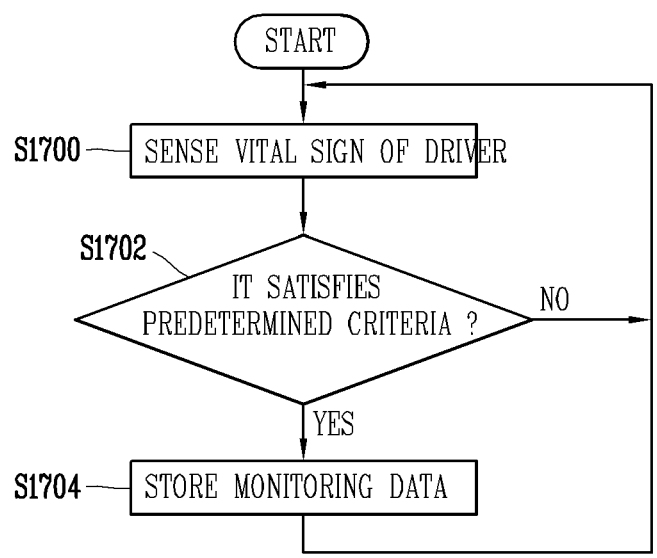
FIG. 17 is a flowchart illustrating a process in which a robot according to an embodiment of the present disclosure classifies and stores monitoring data based on a vital signal of a driver.

FIG. 17 is a flowchart illustrating a process in which the robot 800 according to an embodiment of the present disclosure classifies and stores monitoring data based on a vital sign of a driver.

First, the controller 870 may sense a vital sign (biosignal) of the driver (S1700). Here, the vital sign may include various vital signs such as a pupil size (pupil dilation), a pulse rate, a blood pressure, a voice, a facial expression, a gesture, eye movement, etc.

When the vital sign is sensed, the controller 870 may determine whether the sensed vital sign satisfies preset criteria (S1702).

For example, the preset criteria of the step 1702 may be determined according to whether values of the vital sign detected in the step 1700 is met at least one preset criterion. The preset criteria may be vital sign values corresponding to when the user gets startled or upset. That is, the step 1702 may be for detecting whether the user is startled or upset more than a predetermined level based on an analysis result of the user's vital sign.

When the collected vital sign satisfies the preset criteria, that is, when the user is startled or upset more than the predetermined level, the controller 870 may classify and store information monitored from at least one of the inside and the outside of the vehicle 100 (S1704). In more detail, when the user is startled due to being involved in an accident, or when the vital sign changes irregularly due to witnessing a car accident or the like, the controller 870 may detect this and store the monitored information.

Here, the controller 870 may store the monitoring information stored in the step 1704 separately from another monitoring information. For example, when the monitoring information is stored in the step 1704, the controller 870 may also store information of a user's status (condition) determined based on the vital sign collected in the step 1700. Accordingly, the monitoring information stored in the step 1704 may be stored by grouping according to the user's status.

Meanwhile, the described embodiments may be modified in various different ways, all without departing from the spirit or scope of the present disclosure. In particular, in these embodiments of the present disclosure, the robot 800 includes the projector as the display unit 851, so as to output image information by projecting a beam of light onto at least some portions of the windshield glass. Here, the controller 870 may output the image information by inverting left and right depending on whether a target (person) for displaying the image information is inside or outside the vehicle.

For example, as described above, when the user in the vehicle 100 inputs a request to the robot 800, the robot 800 may determine that the target for an image information output is in the vehicle 100. Accordingly, the image information may be output in a first direction so that a text is normally displayed to the user inside the vehicle 100.

On the other hand, when the user located outside the vehicle 100 inputs a request to the robot 800, the robot 800 may determine that a target for an image information output is outside the vehicle 100. Accordingly, the image information may be output in a second direction so that a text is normally displayed to the user located outside the vehicle 100. In this case, the first direction and the second direction may be inverted from each other.

Meanwhile, it has also been mentioned that the internal environment of the vehicle 100 may be monitored. In this case, the controller 870 may also detect aggressive driving based on a result of monitoring inside of the vehicle 100. For example, when a driver shows predetermined behaviors, like excessively manipulating a steering wheel, using a bad language such as insults, or driving too fast more than necessary, the controller 870 determines that the driver is driving aggressively. Then the controller 870 may control such that the head 902 of the robot 800 is directed at the driver for monitoring inside of the vehicle 100 instead of outside of the vehicle 100. An image of the driver may also be captured.

In addition, the controller 870 may output a voice message or a sound for stopping the aggressive driving. When the driver is a non-registered user, the controller 870 may notify the registered user of the driver's aggressive driving and transmit information related to the current driving status of the vehicle 100 to the registered user's mobile terminal.

In addition, the controller 870 may detect drowsy driving based on a result of monitoring inside of the vehicle 100. In this case, the controller 870 may recommend a rest or may generate a control signal for circulating air in the vehicle 100.

According to the embodiments of the present disclosure, one or more of the following effects can be provided.

First, a function desired by a user is provided in an intuitive manner by using a robot capable of interacting with the user, thereby allowing the user to use vehicle functions more easily and conveniently.

Second, user convenience can be further enhanced by providing a new vehicle function through interaction with the user.

The effects of the present disclosure are not limited to those effects mentioned above, and other effects not mentioned may be clearly understood by those skilled in the art from the description of the appended claims.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

the invention claimed is:

1. A robot provided in a vehicle, comprising:
    a body;
    a head positioned above the body;
    an actuator configured to apply an external force to allow the head to move relative to the body;
    a camera disposed on the head to capture an image;
    a communication unit configured to perform communications with at least one or more devices provided in the vehicle; and
    a processor configured to control the actuator, so that the camera is directed toward an inside or outside of the vehicle based on information received via the communication unit,
    wherein the processor controls the actuator to monitor a passenger in the vehicle, instead of monitoring outside of the vehicle, when the passenger in the vehicle shows a predetermined behavior.

2. The robot of claim 1, wherein the processor controls the actuator for capturing an object, when the object enters a predetermined area defined based on the vehicle.

3. The robot of claim 2, wherein the processor monitors the object approaching the predetermined area by using an image received from an image sensor provided in the vehicle, and
    controls the actuator so that the camera is directed toward a different direction according to a position of the object.

4. The robot of claim 3, further comprising an image output unit configured to display visual information on a windshield of the vehicle,
    wherein the processor sets some portions of the windshield as an image display area based on the position of the object, and controls the actuator to display the visual information on the image display area, and
    wherein the image display area is changed according to the position of the object.

5. The robot of claim 4, wherein the processor identifies a touch applied to the image display area by using the image captured by the camera, and
    performs at least one function based on the identified touch.

6. The robot of claim 4, wherein the processor determines a target for the visual information,
    outputs the visual information as it is when the target is located inside of the vehicle, and
    outputs the visual information by inverting left and right when the target is located outside of the vehicle.

7. The robot of claim 2, wherein at least one of devices provided in the vehicle is operated to transmit information via the communication unit when the vehicle is turned off, and
    wherein the at least one device operated while the vehicle is turned off is variably determined by the processor.

8. The robot of claim 7, wherein the processor performs user authentication for the object in response to the object entering the predetermined area while the vehicle is turned off, and
    transmits a control command for operating the at least one of the devices via the communication unit when the user authentication is successfully completed.

9. The robot of claim 8, wherein the processor selects at least one of a plurality of lamps, door locks and direction indicators, or a horn of the vehicle based on a position of the object, and transmits a control command via the communication unit so that the selected one is operated.

10. The robot of claim 2, wherein the processor, when a plurality of objects enters the predetermined area, controls the actuator to calculate priorities based on at least one of a size, a speed, or a type of object, so as to monitor an object having the highest priority.

11. The robot of claim 2, wherein the processor calculates at least one of a travelling direction or a travelling speed for monitoring the object, and
    controls the communication unit to enable autonomous driving of the vehicle according to the calculated one.

12. The robot of claim 2, further comprising a memory,
    wherein the processor stores object information in the memory when the object enters the predetermined area while the vehicle is turned off,
    sets a direction that is the most frequently approached by objects as a basic monitoring direction based on object information stored in the memory, and
    controls the actuator so that the camera is directed toward the basic monitoring direction when the vehicle is turned off.

13. The robot of claim 1, wherein the processor controls the actuator to face toward the passenger when a voice command is input from the passenger on board.

14. The robot of claim 1, wherein the processor detects an object viewed by the passenger in the vehicle based on information received via the communication unit, and
    controls the actuator so that the camera captures the detected object.

15. The robot of claim 14, further comprising a memory,
    wherein the processor stores an image captured by the camera in the memory when a vital sign of the passenger satisfies reference criteria, and wherein the vital sign is defined by at least one of a heart rate, a voice, a facial expression, a gesture, or eye movement of the passenger.

16. The robot of claim 1, wherein the processor controls the actuator so that at least one of a moving speed or a moving distance of the head of the robot is changed according to a driving speed of the vehicle.

17. The robot of claim 1, wherein the processor controls the actuator so that the camera monitors outside of the vehicle when the passenger in a driver's seat of the vehicle is a predetermined person, and
monitors the passenger when the passenger is not the predetermined person.

18. The robot of claim 1, wherein the processor controls the actuator to monitor inside of the vehicle when the passenger is in the vehicle, and
to monitor outside of the vehicle when no passenger is in the vehicle.

19. The robot of claim 1, wherein the processor controls the actuator so that the camera monitors outside of the vehicle when the vehicle is driven manually, and
monitors inside of the vehicle when the vehicle is driven autonomously.

\* \* \* \* \*